(12) United States Patent
Lee et al.

(10) Patent No.: US 10,884,556 B2
(45) Date of Patent: Jan. 5, 2021

(54) GATE DRIVING INTEGRATED CIRCUIT FOR A TOUCH DISPLAY AND OPERATING METHOD THEREOF

(71) Applicant: SAMSUNG ELECTRONICS CO., LTD., Suwon-si (KR)

(72) Inventors: Chang-Ju Lee, Suwon-si (KR); Jaeho Park, Hwaseong-si (KR); YoonKyung Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/028,754

(22) Filed: Jul. 6, 2018

(65) Prior Publication Data

US 2019/0196618 A1 Jun. 27, 2019

(30) Foreign Application Priority Data

Dec. 21, 2017 (KR) .................. 10-2017-0177162

(51) Int. Cl.

| | |
|---|---|
| *G06F 3/045* | (2006.01) |
| *G06F 3/044* | (2006.01) |
| *G09G 3/36* | (2006.01) |
| *G06F 3/041* | (2006.01) |
| *G09G 3/3266* | (2016.01) |
| *G06F 3/0488* | (2013.01) |
| *G09G 3/20* | (2006.01) |

(52) U.S. Cl.
CPC ............ *G06F 3/044* (2013.01); *G06F 3/0412* (2013.01); *G06F 3/0443* (2019.05); *G06F 3/04166* (2019.05); *G09G 3/3266* (2013.01); *G09G 3/3677* (2013.01); *G06F 3/0488* (2013.01); *G06F 3/04184* (2019.05); *G09G 3/20* (2013.01); *G09G 2300/0861* (2013.01); *G09G 2310/0267* (2013.01); *G09G 2310/0286* (2013.01); *G09G 2310/08* (2013.01); *G09G 2354/00* (2013.01)

(58) Field of Classification Search
CPC ...... G06F 3/044; G06F 3/0488; G06F 3/0412; G06F 3/04166; G06F 3/0443; G06F 3/04184; G09G 3/3677; G09G 3/3266; G09G 3/20; G09G 2300/0861; G09G 2310/0267; G09G 2310/0286; G09G 2310/08; G09G 2354/00
USPC .......................................................... 345/174
See application file for complete search history.

(56) References Cited

U.S. PATENT DOCUMENTS 8,373,729 B2 2/2013 Lee et al.
8,970,547 B2 3/2015 Sabo et al.
(Continued)

FOREIGN PATENT DOCUMENTS

KR 10-2014-0083312 A 7/2014

*Primary Examiner* — Adam J Snyder
(74) *Attorney, Agent, or Firm* — Lee IP Law, PC

(57) ABSTRACT

Embodiments relate to a gate driving integrated circuit and an operating method thereof operating in a time-division method divided into a display period and a touch period. The gate driving integrated circuit includes a charging circuit, a gate control circuit, and a discharging circuit. The charging circuit charges a memory element. The discharging circuit discharges the memory element. The gate control circuit outputs a gate-on voltage to a gate line based on the charged memory element in during display period. The gate control circuit electrically disconnects the memory element from the gate control circuit during the touch period.

18 Claims, 13 Drawing Sheets

(56) References Cited

U.S. PATENT DOCUMENTS

| | | | |
|---|---|---|---|
| 9,349,317 B2 | 5/2016 | Kim et al. | |
| 9,495,052 B2 | 11/2016 | Shepelev | |
| 9,946,349 B2* | 4/2018 | Wang | G06F 3/016 |
| 2012/0268397 A1 | 10/2012 | Lee et al. | |
| 2014/0176489 A1 | 6/2014 | Park | |
| 2015/0049045 A1 | 2/2015 | Yousefpor | |
| 2015/0161963 A1 | 6/2015 | Kang et al. | |
| 2016/0034097 A1* | 2/2016 | Chae | G06F 3/044 |
| | | | 345/173 |
| 2016/0098117 A1 | 4/2016 | Ouh et al. | |
| 2016/0103510 A1* | 4/2016 | Liu | G09G 3/2092 |
| | | | 345/214 |
| 2016/0224175 A1* | 8/2016 | Moon | G06F 3/0412 |
| 2016/0266699 A1* | 9/2016 | Zhao | G09G 3/3677 |
| 2016/0328045 A1* | 11/2016 | Wang | G06F 3/016 |
| 2016/0365024 A1 | 12/2016 | Pyo | |
| 2016/0365061 A1* | 12/2016 | Hong | G06F 3/041 |
| 2016/0378232 A1* | 12/2016 | Hsu | G09G 3/3677 |
| | | | 345/174 |
| 2017/0017326 A1* | 1/2017 | Wu | G09G 3/2096 |
| 2017/0102801 A1* | 4/2017 | Ko | G06F 3/044 |
| 2017/0102814 A1* | 4/2017 | Xu | G06F 3/0412 |
| 2017/0115808 A1* | 4/2017 | Cho | G06F 3/0412 |
| 2017/0123556 A1* | 5/2017 | Lin | G06F 3/0412 |
| 2017/0168648 A1 | 6/2017 | Takahashi | |
| 2017/0185218 A1 | 6/2017 | Lee et al. | |
| 2017/0186371 A1 | 6/2017 | Takahashi et al. | |
| 2018/0196563 A1* | 7/2018 | Iwase | G11C 19/28 |
| 2018/0246607 A1* | 8/2018 | Pai | G06F 3/0412 |
| 2018/0329547 A1* | 11/2018 | Wu | G11C 19/28 |

\* cited by examiner

US 10,884,556 B2

GATE DRIVING INTEGRATED CIRCUIT FOR A TOUCH DISPLAY AND OPERATING METHOD THEREOF

CROSS-REFERENCE TO RELATED APPLICATION

Korean Patent Application No. 10-2017-0177162, filed on Dec. 21, 2017, in the Korean Intellectual Property Office, and entitled: "Gate Driving Integrated Circuit and Operating Method Thereof," is incorporated by reference herein in its entirety.

BACKGROUND

1. Field

Embodiments relate to a touch display device, more particularly, to a gate driving integrated circuit and an operating method thereof.

2. Description of the Related Art

Recently, an in-cell type touch display device combining a display device and a touch panel is being developed to provide a very thin and light weight device. This may be realized by commonly using an electrode of the touch panel as an electrode of the display panel. However, the combination of the display device and the touch panel causes various problems related to a driving method, and various driving methods to solve the problems are being developed.

SUMMARY

According to an example embodiment, a gate driving integrated circuit operates in a time-division method divided into a display period and a touch period. The gate driving integrated circuit includes a charging circuit, a gate control circuit including a memory element, and a discharging circuit. The charging circuit charges a memory element during a charging time of the display period. The gate control circuit outputs a gate-on voltage to a gate line based on the charged memory element during a control time of the display period. The discharging circuit discharges the charged memory element during a discharging time of the display period. The gate control circuit is further configured to electrically disconnect the memory element from the gate control circuit during the touch period.

According to an exemplary embodiment, a gate driving integrated circuit includes a shift register outputting a gate-on voltage to a gate line during a portion of a display period and outputting a touch gate voltage to the gate line during a touch period. The shift register includes a gate voltage transmission element providing the gate-on voltage to the gate line during the portion of the display period, a memory element turning on the gate voltage transmission element during the portion of the display period, and a switching element electrically connecting the gate voltage transmission element and the memory element during the display period and electrically disconnecting the gate voltage transmission element and the memory element during the touch period.

According to an example embodiment, an operating method of a gate driving integrated circuit includes charging a memory element of the gate driving integrated circuit during a charging time of a display period, turning on a gate voltage transmission element connected to the memory element based on the charged memory element during a control time of the display period, providing a gate-on voltage to a gate line through the turned on gate voltage transmission element during the control time of the display period, and electrically disconnecting the memory element and the gate voltage transmission element by a switch element during the touch period.

BRIEF DESCRIPTION OF THE DRAWINGS

Features will become apparent to those of skill in the art by describing in detail example embodiments with reference to the attached drawings in which.

DETAILED DESCRIPTION

Below, embodiments will be described clearly and in detail with reference to accompanying drawings to such an extent that an ordinary one in the art implements embodiments.

Figure 1:
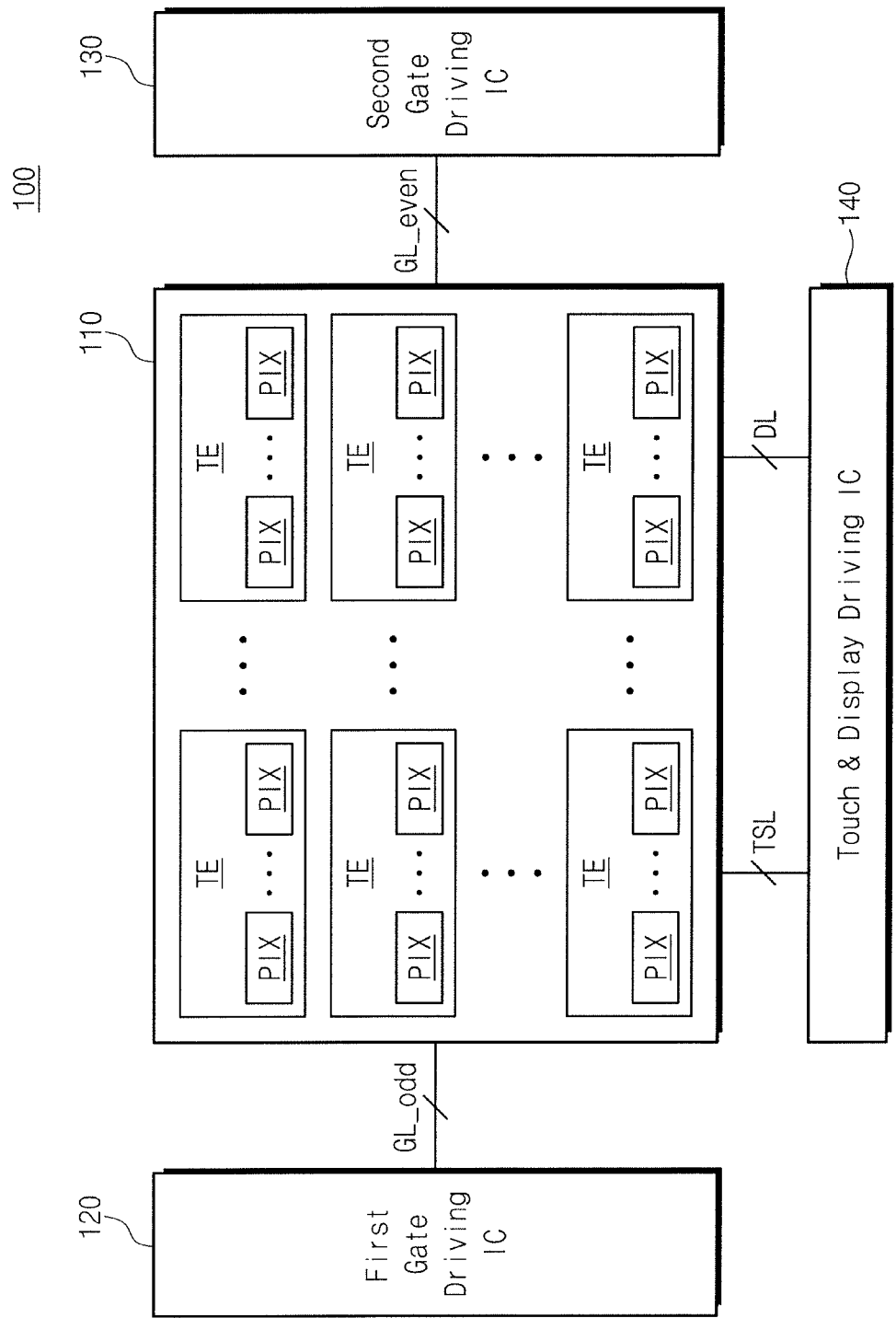
FIG. 1 illustrates a block diagram of a touch display device according to an embodiment.

FIG. 1 is a block diagram illustrating a touch display device according to an embodiment. Referring to FIG. 1, the touch display device 100 includes a touch display panel 110, a first gate driving integrated circuit 120, a second gate driving integrated circuit 130, and a touch display driving integrated circuit 140. The touch display device 100 may be an in-cell type touch display device combining a display panel and a touch panel, but it is not limited thereto The touch display device 100 may be installed in electronic devices providing an image display function. The electronic devices may be personal computers (PCs) or mobile devices, but are not limited thereto. Examples of the mobile devices may include laptop computers, mobile phones, smartphones, tablet PCs, personal digital assistants (PDAs), enterprise digital assistants (EDAs), digital still cameras, digital video cameras, portable multimedia players (PMPs), personal navigation devices, portable navigation devices (PNDs), handheld game consoles, mobile internet devices (MIDs), internet of things (IoT), internet of everything (IoE), drones, e-books, etc., but are not limited thereto.

The touch display panel 110 may include a plurality of pixels PIX and a plurality of touch electrodes TE. The plurality of pixels PIX are connected to a plurality of first gate lines GL_odd and a plurality of second gate lines GL_even, respectively. The plurality of pixels PIX are connected to a plurality of data lines DL, respectively. The plurality of pixels PIX may display an image using gate voltages applied from the first gate lines GL_odd and the second gate lines GL_even and data voltages applied from the data lines DL.

The plurality of touch electrodes TE may be electrodes to sense a touch by a user. The plurality of touch electrodes TE is connected to touch sensing lines TSL. The plurality of touch electrodes TE may be used as a common electrode of the plurality of pixels PIX. For example, each of the plurality of pixels PIX displays the image based on a difference between data voltages received from data lines DL and a common voltage. Each of the plurality of touch electrodes TE may overlap one and more pixels PIX when viewed in a displaying direction. One touch electrode TE may have a larger area than one pixel PIX. The one touch electrode TE may be used as a common electrode for one or more pixels PIX.

The touch display panel 110 may be a liquid crystal display panel. Alternatively, the touch display panel 110 may include various display panels, e.g., an organic light emitting display panel, an electrophoretic display panel, an electrowetting display panel, and the like. In an example, the touch display device 100 including the liquid crystal display panel may further include a polarizer and a backlight unit.

The first gate driving integrated circuit 120 may be connected to some of the plurality of pixels PIXs, e.g., a first group of pixels, in the touch display panel 110 through the first gate lines GL_odd. The second gate driving integrated circuit 130 may be connected to the remaining pixels of the plurality of pixels PIXs, e.g., a second group of pixels, in the touch display panel 110 through the second gate lines GL_even. A configuration of the first gate driving integrated circuit 120 may be substantially the same as that of the second gate driving integrated circuit 130. In an example, although the touch display device 100 is shown as including two gate driving integrated circuits, various number of gate driving integrated circuits may be included in the touch display device 100. For example, the touch display device 100 may include one gate driving integrated circuit or four or more gate driving integrated circuits.

The first gate driving integrated circuit 120 may be connected to pixels PIX arranged in odd-numbered rows to apply gate voltages to the pixels PIX arranged in the odd-numbered rows. The second gate driving integrated circuit 130 may be connected to pixels PIX arranged in even-numbered rows to apply gate voltages to the pixels PIX arranged in the even-numbered rows. A clock signal to apply the gate voltages of the first gate driving integrated circuit 120 may have a phase difference of ¼ period with a clock signal to apply the gate voltages of the second gate driving integrated circuit 130. For example, the first gate driving integrated circuit 120 applies a gate voltage to pixels PIX arranged in a first row. Then, after the ¼ period, the second gate driving integrated circuit 130 may apply a gate voltage to pixels PIX arranged in a second row. Then, after another ¼ period, the first gate driving integrated circuit 120 may apply a gate voltage to pixels PIX arranged in a third row. However, the first and second gate driving integrated circuits 120 and 130 described above will be understood as one embodiment, and the phase difference may vary depending on the number of the gate driving integrated circuits or the number of clock signals used.

The first and second gate driving integrated circuits 120 and 130 may be on the touch display panel 110. The first and second gate driving integrated circuits 120 and 130 may be on a non-display area or a non-touch area of the touch display panel 110, and may be adjacent to the plurality of pixel PIX in the row direction.

When the touch display driving integrated circuit 140 includes the first and second gate driving integrated circuits 120 and 130, since the first and second gate lines GL_odd and GL_even extend from the touch display driving integrated circuit 140 to side of the touch display panel 110, it may be difficult to secure a space to dispose the first and second gate lines GL_odd and GL_even adjacent to the touch display panel 110 in the row direction. In this case, a width of a bezel of the touch display device 100 to cover the gate lines may increase, which may reduce a display area.

When the first and second gate driving integrated circuits 120 and 130 are adjacent to the plurality of pixel PIX in the row direction, the space to dispose the first and second gate lines GL_odd and GL_even may be effectively secured. Alternatively, the first and second gate driving integrated circuits 120 and 130 may be included in the touch display driving integrated circuit 140.

The touch display driving integrated circuit 140 may be connected to the plurality of pixels PIX of the touch display panel 110 through the data lines DL. The touch display driving integrated circuit 140 may apply the data voltages to the plurality of pixels PIX through the data lines DL. The plurality of pixels PIX may display the image based on the received data voltages.

The touch display driving integrated circuit 140 may be connected to the plurality of touch electrodes TE through the touch sensing lines TSL. The touch display driving integrated circuit 140 may provide touch sensing voltages to the plurality of touch electrodes TE through the touch sensing lines TSL and may sense whether a user touches the touch electrodes TE based on a change of the touch sensing voltages generated in the plurality of touch electrodes TE. For example, when the user touches at least one touch electrode of the plurality of touch electrodes TE, a touch sensing voltage may be changed by a capacitance between the user and the touch electrode. The touch display driving integrated circuit 140 may sense a touch of the user based on the change of the touch sensing voltage.

The touch display device 100 may further include a timing controller to control the first and second gate driving integrated circuits 120 and 130, and the touch display driving integrated circuit 140. The timing controller may control the first and second gate driving integrated circuits 120 and 130, and the touch display driving integrated circuit 140 based on a vertical synchronization signal that is a frame distinction signal and a horizontal synchronization signal that is a row distinction signal.

A period in which the touch display device 100 outputs an image for one frame may include at least one display period and at least one touch period. That is, the one frame (for example, one period of the vertical synchronization signal) may include a plurality of display periods and a plurality of touch periods. The touch display device 100 may display a part of the one frame during the display period and may sense a touch on a part of the plurality of touch electrodes TE during the touch period.

Figure 2:
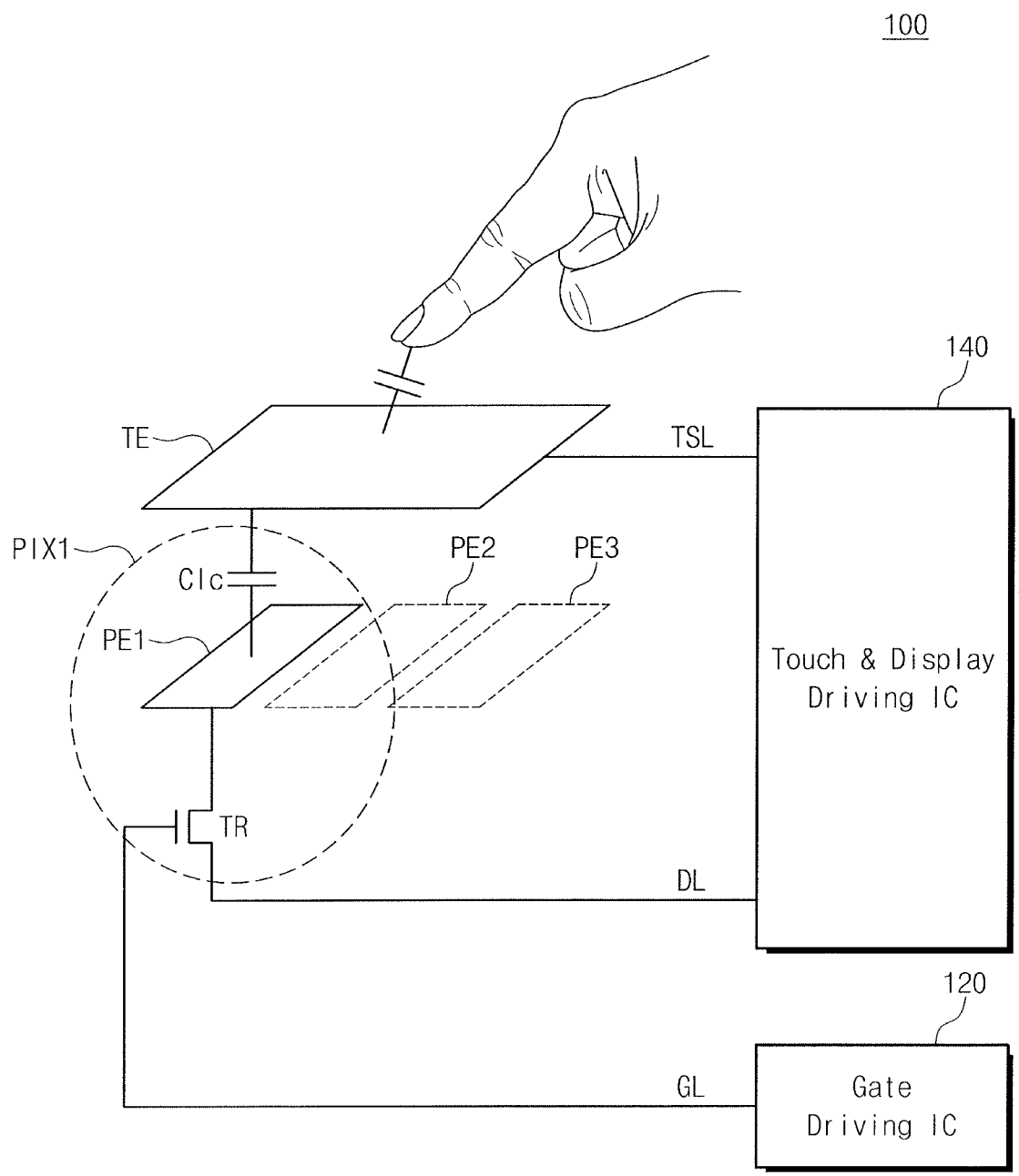
FIG. 2 illustrates a view of configurations of a touch electrode and pixels of the touch display device shown in FIG. 1.

FIG. 2 is a view showing configurations of a touch electrode and pixels of the touch display device shown in FIG. 1. For the convenience of explanation, some of configurations shown in FIG. 1 are shown in FIG. 2. Referring to FIG. 2, the touch display device 100 may include a first pixel PIX1, a touch electrode TE, a gate line GL, a data line DL, a touch sensing line TSL, the gate driving integrated circuit 120, and the touch display driving integrated circuit 140.

The first pixel PIX1 is one of the plurality of pixels PIX shown in FIG. 1. The first pixel PIX1 may include a first pixel electrode PE1 and a pixel transistor TR. For example, the pixel transistor TR may be a thin film transistor (TFT). A first terminal, e.g., a source terminal, of the pixel transistor TR is connected to the touch display driving integrated circuit 140 through the data line DL, a second terminal, e.g., a drain terminal, of the pixel transistor TR is connected to the first pixel electrode PE1, and a control terminal, e.g., a gate terminal, of the pixel transistor TR is connected to the gate driving integrated circuit 120 through the gate line GL. For the convenience of explanation, a configuration of the first pixel PIX1 only illustrating the first pixel electrode PE1 is shown in FIG. 2, but the first pixel PIX1 may include a second pixel electrode PE2 and a third pixel electrode PE3.

The touch electrode TE may be on the first to third pixel electrodes PE1 to PE3. A liquid crystal layer may be between the touch electrode TE and the first pixel electrode PE1. A liquid crystal capacitor Clc may be formed by the first pixel electrode PE1, the touch electrode TE, and the liquid crystal layer.

A common voltage is applied to the touch electrode TE in the display period. A voltage to be provided to the liquid crystal capacitor Clc is determined based on a difference between the common voltage applied to the touch electrode TE and a data voltage applied to the first pixel electrode PE1. An arrangement of liquid crystal modules of the liquid crystal layer may be determined based on the voltage provided to the liquid crystal capacitor Clc, and light incident on the liquid crystal layer may be transmitted or blocked by the liquid crystal layer.

A touch sensing voltage is applied to the touch electrode TE in the touch period. The touch sensing voltage may be an AC voltage to sense a capacitance between the user and the touch electrode TE. A voltage formed on the touch electrode TE may be changed based on the capacitance between the touch electrode TE and the user when the user touches the touch electrode TE or is adjacent to the touch electrode TE. The touch display driving integrated circuit 140 may sense the touch based on the changed voltage of the touch electrode TE.

The gate driving integrated circuit 120 provides a gate voltage to the control terminal of the pixel transistor TR through the gate line GL. The gate driving integrated circuit 120 provides a gate-on voltage to the pixel transistor TR when the first pixel PIX1 displays an image in the display period. The gate driving integrated circuit 120 may provide a gate-off voltage to the pixel transistor TR when the first pixel PIX1 does not display an image in the display period.

The gate driving integrated circuit 120 provides a touch gate voltage to the pixel transistor TR during the touch period. The touch gate voltage may have the same period as the touch sensing voltage applied to the touch electrode TE in the touch period. The touch gate voltage may have the same period and magnitude as the touch sensing voltage so that a data voltage stored in the pixel is maintained. In this case, a potential difference between the touch electrode TE and the gate line GL may be minimized, and a parasitic capacitance may be minimized in the touch period. Similarly in the driving of the data line DL, a potential difference between the touch electrode TE and the data line DL may be minimized, and a parasitic capacitance may be minimized in the touch period.

Figure 3:
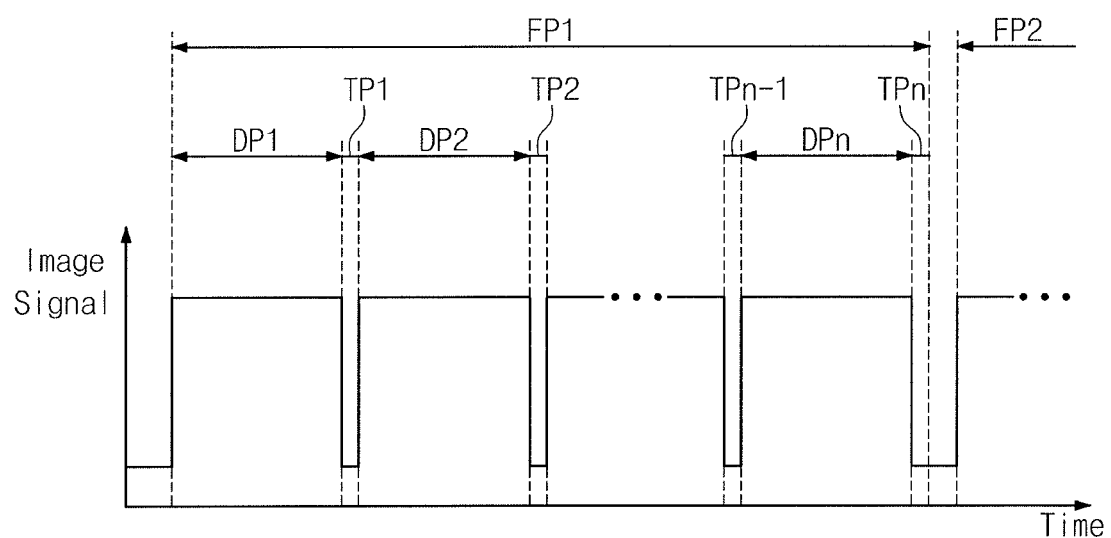
FIG. 3 illustrates a timing diagram illustrating the display period and the touch period of the touch display device.

FIG. 3 is a timing diagram illustrating the display period and the touch period of the touch display device. For the convenience of explanation, the timing diagram shown in FIG. 3 will be described with reference to the reference numerals of FIG. 1. Referring to FIG. 3, the touch display device 100 displays a first frame image based on an image signal during a first frame period FP1. The touch display device 100 displays a second frame image following the first frame image based on an image signal during a second frame period FP2. The touch display device 100 may distinguish the first frame period FP1 and the second frame period FP2 based on the vertical synchronization signal.

The first frame period FP1 may include a plurality of display periods DP1 to DPn and a plurality of touch periods TP1 to TPn. The touch display device 100 may operate in a time-division method divided into the plurality of display periods DP1 to DPn and the plurality of touch periods TP1 to TPn during the first frame period FP1. The plurality of display periods DP1 to DPn may have a same time as each other, e.g., equal widths. The plurality of touch periods TP1 to TPn may have a same time as each other, e.g., equal widths.

The touch display device 100 may drive the plurality of pixels PIX by dividing into n number of pixels in first to n-th display periods DP1 to DPn. For example, when the touch display device 100 includes 5n rows of pixels, the touch display device 100 may drive pixels PIX of first to fifth rows during a first display period DP1. In this case, the first gate driving integrated circuit 120 and the second gate driving integrated circuit 130 may sequentially apply the gate-on voltage to first to fifth gate lines. Also, the touch display device 100 may drive pixels PIX of sixth to tenth rows during a second display period DP2. The touch display device 100 may drive pixels PIX of (n-4)-th to n-th rows during a n-th display period DPn.

The touch display device 100 may drive the plurality of touch electrode TE by dividing into n number of touch electrodes in first to n-th touch periods TP1 to TPn. For example, when the touch display device 100 includes n columns of touch electrodes, the touch display device 100 may drive touch electrodes of a first column during a first touch period TP1. In this case, the touch display driving integrated circuit 140 may apply the touch sensing voltage to a first touch sensing line. Also, the touch display device 100 may drive touch electrodes of a second column during a second touch period TP2. The touch display device 100 may drive touch electrodes of a n-th column during a n-th touch period TPn.

In an example, the plurality of pixels PIX are driven in the unit of row in the plurality of display periods DP1 to DPn, the plurality of touch electrodes TE are driven in the unit of column in the plurality of touch periods TP1 to TPn, but are not limited thereto. For example, in the plurality of display periods DP1 to DPn and the plurality of touch periods TP1 to TPn, the touch display device 100 may display the image by dividing into the unit of row, the unit of column, or the unit of specific area, and may sense the touch.

The in-cell type touch display device 100 combining the display device and the touch panel may have configurations to perform a display function and a touch function. Also, as the display period and the touch period are repeated in the touch display device 100, operations of the first and second gate driving integrated circuits 120 and 130 in the display period may affect the touch period. The gate driving integrated circuit to be described below may be configured to minimize a deterioration of the touch function of the touch period which may be caused by an operation of the display period.

Figure 4:
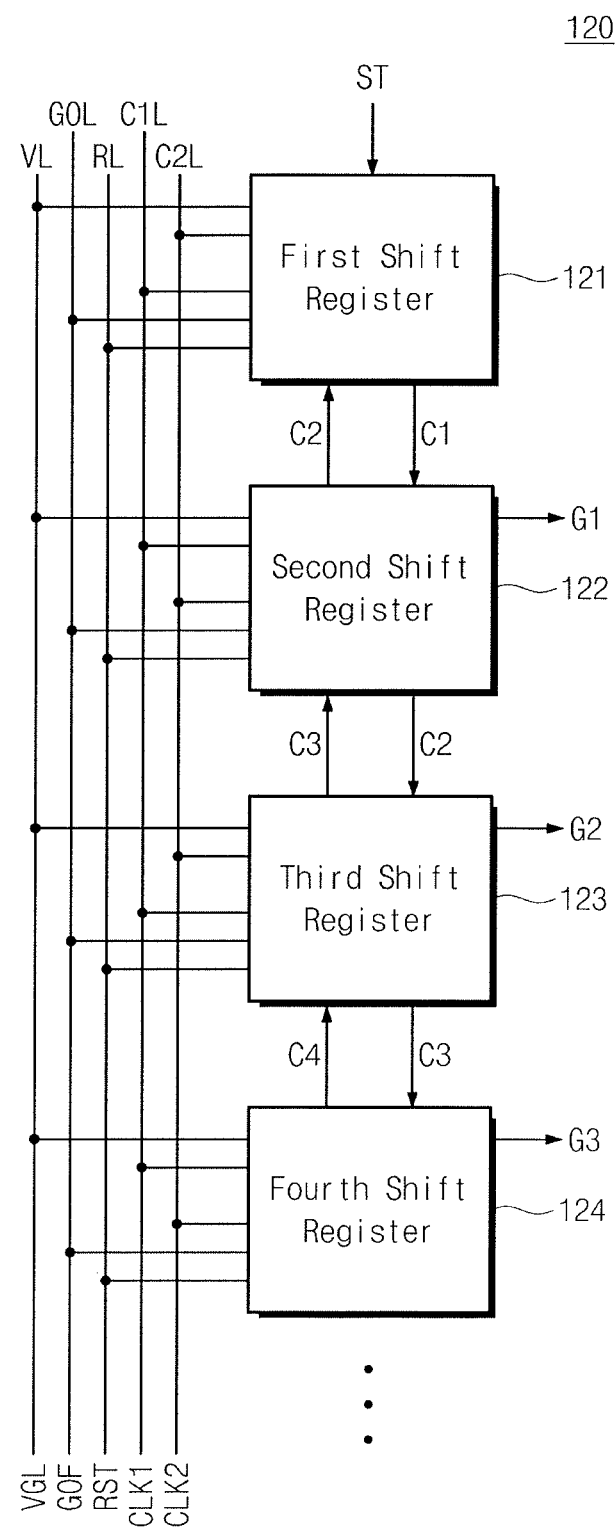
FIG. 4 illustrates a view of a configuration of the gate driving integrated circuit shown in FIG. 2.

FIG. 4 is a view showing a configuration of the gate driving integrated circuit shown in FIG. 2. For the convenience of explanation, the gate driving integrated circuit 120 shown in FIG. 4 will be described with reference to the reference numerals of FIG. 2. Referring to FIG. 4, the gate driving integrated circuit 120 includes a plurality of shift registers 121 to 124, a voltage line VL, a gate-off signal line GOL, a reset signal line RL, a first clock signal line C1L, and a second clock signal line C2L. The gate driving integrated circuit 120 may be one of the first gate driving integrated circuit 120 and the second gate driving integrated circuit 130.

A gate low voltage VGL may be provided to the plurality of shift registers 121 to 124 through the voltage line VL. The gate low voltage VGL may have a lowest voltage level of voltage levels generated by the gate driving integrated circuit 120. For example, the gate low voltage VGL may be a ground voltage. The gate low voltage VGL may be applied to the gate lines during a time except for a time to turn on the pixel transistor TR in the display period. When the gate low voltage VGL is applied to the pixel transistor TR in the display period, the pixel transistor TR is turned off. Additionally, the gate low voltage VGL may be applied to the gate lines during the touch period. The gate low voltage VGL may have a waveform having the same frequency and magnitude as the touch sensing voltage in the touch period.

The gate low voltage VGL may minimize the potential difference between the gate line GL and the touch electrode TE during the touch sensing and may reduce an effect on the parasitic capacitance between the gate line and the touch electrode. The gate low voltage VGL described above may be used in the gate driving integrated circuit 120 including N-type thin film transistors. However, when the gate driving integrated circuit 120 includes P-type thin film transistors, a gate high voltage may be provided to the plurality of shift registers 121 to 124 through the voltage line VL.

A gate-off signal GOF may be provided to the plurality of shift registers 121 to 124 through the gate-off signal line GOL. The gate-off signal GOF may have a high level during the touch period. The gate-off signal GOF may interrupt an output of the gate-on voltage of the plurality of shift registers 121 to 124. When the gate driving integrated circuit 120 receives the gate-off signal having the high level, the gate driving integrated circuit 120 may apply the gate low voltage VGL to the gate lines.

A reset signal RST may be provided to the plurality of shift registers 121 to 124 through the reset signal line RL. When the reset signal RST is provided to the plurality of shift registers 121 to 124, the gate driving integrated circuit 120 may be reset.

A first clock signal CLK1 may be provided to the plurality of shift registers 121 to 124 through the first clock signal line C1L. The first clock signal CLK1 may be a signal having a high level and a low level repetitively during the display period. The first clock signal CLK1 may be a signal having the low level during the touch period. The first clock signal CLK1 may be applied to the same input terminal in a first shift register 121 and a third shift register 123. The first clock signal CLK1 may be applied to the same input terminal in a second shift register 122 and a fourth shift register 124.

A second clock signal CLK2 may be provided to the plurality of shift registers 121 to 124 through the second clock signal line C2L. The second clock signal CLK2 may be a signal having a high level and a low level repetitively during the display period. The second clock signal CLK2 may be a signal inverted from the first clock signal CK1. The second clock signal CLK2 may be a signal having the low level during the touch period. The second clock signal CLK2 may be applied to the same input terminal in the first shift register 121 and the third shift register 123. The second clock signal CLK2 may be applied to the same input terminal in the second shift register 122 and the fourth shift register 124.

The first shift register 121 may receive a strobe signal ST from the timing controller in the display period. For example, the first shift register 121 may receive the strobe signal ST based on the first clock signal CLK1 having the high level during a first time of the display period. The first shift register 121 may output a first carry signal C1 based on the strobe signal ST and the second clock signal CLK2 having the high level during a second time after the first time. Thus, the first shift register 121 may not be connected to the gate lines.

The second shift register 122 may receive the first carry signal C1 from the first shift register 121 based on the second clock signal CLK2 having the high level during the second time. The second shift register 122 may output a first gate-on voltage G1 to a first gate line based on the first clock signal CLK1 having the high level during a third time after the second time. At the same time, the second shift register 122 may output a second carry signal C2 to the first shift register 121 and the third shift register 123 based on the first clock signal CLK1 having the high level.

The third shift register 123 may receive the second carry signal C2 from the second shift register 122 based on the first clock signal CLK1 having the high level during the third time. The third shift register 123 may output a second gate-on voltage G2 to a second gate line based on the second clock signal CLK2 having the high level during a fourth time after the third time. At the same time, the third shift register 123 may output a third carry signal C3 to the second shift register 122 and the fourth shift register 124 based on the second clock signal CLK2 having the high level. The second shift register 122 may not output the first gate-on voltage G1 to the first gate line based on the third carry signal C3.

The fourth shift register 124 may receive the third carry signal C3 from the third shift register 123 based on the second clock signal CLK2 having the high level during the fourth time. The fourth shift register 124 may output a third gate-on voltage G3 to a third gate line based on the first clock signal CLK1 having the high level during a fifth time after the fourth time. At the same time, the fourth shift register 124 may output a fourth carry signal C4. That is, the second to fourth shift registers 122 to 124 may sequentially output the first to third gate-on voltages G1 to G3.

Figure 5:
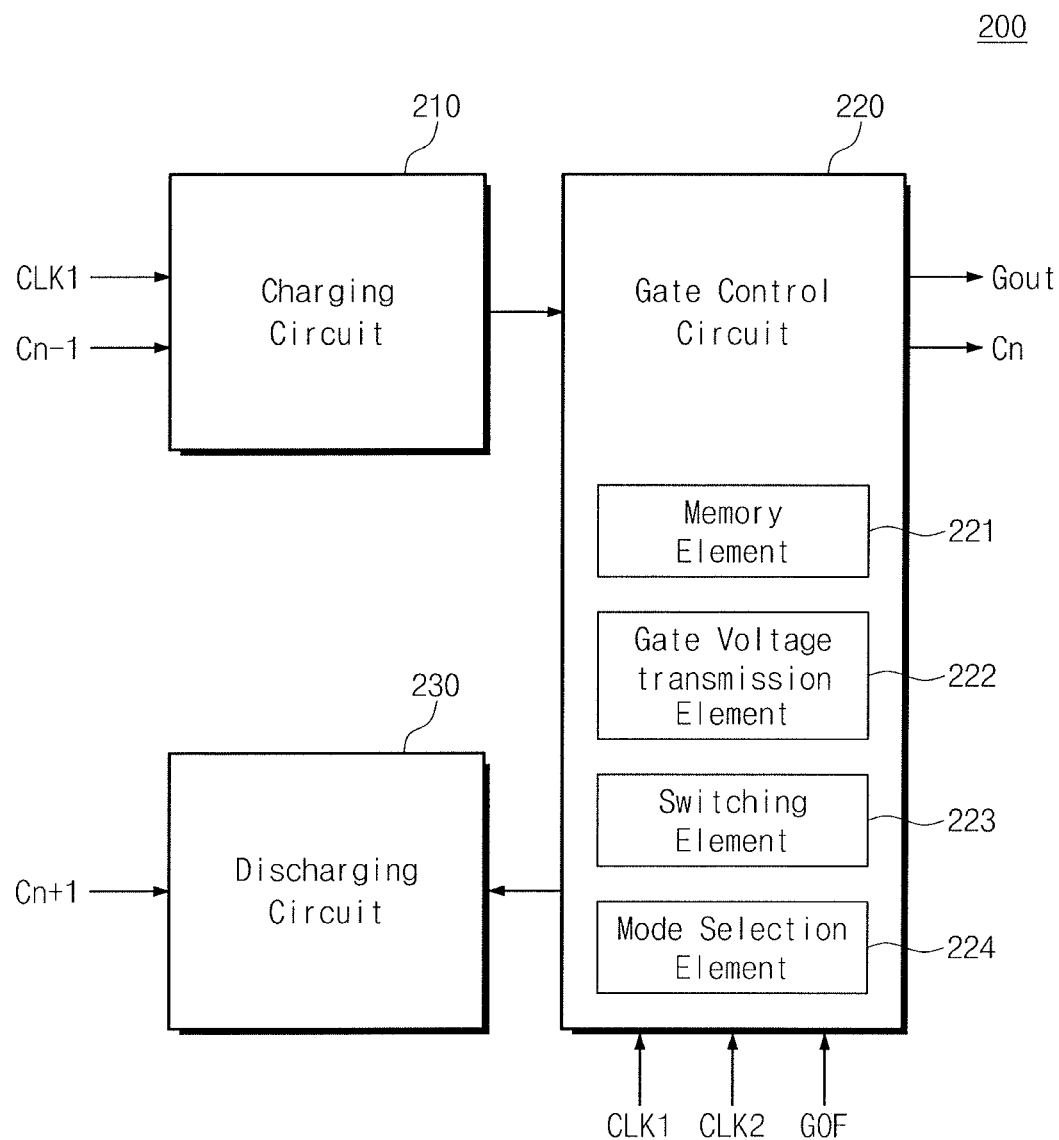
FIG. 5 illustrates a view of a configuration of the shift register shown in FIG. 4.

FIG. 5 illustrates a configuration of the shift register shown in FIG. 4. A shift register 200 shown in FIG. 5 may be one of the first to fourth shift registers 121 to 124. Referring to FIG. 5, the shift register 200 may include a charging circuit 210, a gate control circuit 220, and a discharging circuit 230. For the convenience of explanation, the shift register 200 shown in FIG. 5 will be described with reference to the reference numerals of FIG. 4.

The charging circuit 210 receives a pre-carry signal Cn−1 during a charging time of the display period. When the shift register 200 is the second shift register 122, the charging time may be the second time and the pre-carry signal Cn−1 may be the first carry signal C1 output from the first shift register 121. The shift register 220 may receive the first clock signal CLK1 having the high level during the charging time. When the shift register 200 is the third shift register 123, the first clock signal CLK1 shown in FIG. 5 may be the first clock signal CLK1 to be provided to the third shift register 123. When the shift register 200 is the second shift register 122, the first clock signal CLK1 shown in FIG. 5 may be the second clock signal CLK2 to be provided to the second shift register 122. The charging circuit 210 may provide a charging voltage to the gate control circuit 220 based on the pre-carry signal Cn−1 and the first clock signal CLK1 received during the charging time.

The gate control circuit 220 includes a memory element 221, a gate voltage transmission element 222, a switching element 223, and a mode selection element 224. The gate control circuit 220 may receive the first clock signal CLK1 having the high level and the second clock signal CLK2 having the low level during the charging time. The memory element 221 may be charged based on the charging voltage provided from the charging circuit 210, the first clock signal CLK1, and the second clock signal CLK2. For example, the memory element 221 may include one capacitor element. However, the memory element 221 may include a plurality of capacitor elements that are charged through a charging supplying to adjust a voltage level.

The gate voltage transmission element 222 may transmit the gate-on voltage to the gate line during a control time after the charging time. When the shift register 220 is the second shift register 122, the control time may be the third time. The gate control circuit 220 may receive the first clock signal CLK1 having the low level and the second clock signal CLK2 having the high level during the control time. The gate voltage transmission element 222 may output the gate-on voltage based on the charged memory element 221, the first clock signal CLK1, and the second clock signal CLK2.

The gate control circuit 220 may output a carry signal Cn at the same time as the gate-on voltage output Gout of the gate voltage transmission element 222 during the control time. The gate control circuit 220 may output the carry signal Cn based on the charged memory element 221, the first clock signal CLK1, and the second clock signal CLK2. When the shift register 220 is the second shift register 122, the carry signal Cn may be input to the first shift register 121 and the third shift register 123. In this case, a memory element included in the first shift register 121 may be discharged based on the carry signal Cn. A memory element included in the third shift register 123 may be charged based on the carry signal Cn.

The gate voltage transmission element 222 may be electrically connected to the memory element 221 in the display period. For example, the gate voltage transmission element 222 may be a thin film transistor. In this case, one terminal of the gate voltage transmission element 222 may be connected to one terminal of the memory element 221 and a control terminal of the gate voltage transmission element 222 may be connected to the other terminal of the memory element 221. A potential difference between the one terminal of the gate voltage transmission element 222 and the control terminal of the gate voltage transmission element 222 may be higher than a threshold voltage level of the gate voltage transmission element 222 by the charged memory element 221. That is, the gate voltage transmission element 222 may be turned on during the control time.

The switching element 223 may electrically connect the memory element 221 and the gate voltage transmission element 222 during the display period, and may electrically disconnect the memory element 221 and the gate voltage transmission element 222 during the touch period. For example, a first terminal of the switching element 223 may be connected to the memory element 221 and a second terminal of the switching element 223 may be connected to the gate voltage transmission element 222. When the memory element 221 is charged by an operation of the switching element 223 in the display period, the gate voltage transmission element 222 is turned on. Regardless of whether or not the memory element 221 is charged, the gate voltage transmission element 222 is turned off by an operation of the switching element 223 during the touch period. Therefore, during the touch period, the gate voltage transmission element 222 may not output the gate-on voltage to the gate line and the gate control circuit 220 may not output the carry signal Cn.

The switching element 223 may prevent the gate voltage transmission element 222 from being turned on even if the memory element 221 is not discharged on when the display period is changed to the touch period. In principle, the memory element 221 of the gate control circuit 220 may be discharged during a discharging time after the control time. Therefore, after the output of the gate-on voltage, the gate voltage transmission element 222 has to be turned off. However, the discharging time to discharge the memory element 221 may not be provided when the display period is changed to the touch period. In this case, the switching element 223 may electrically disconnect the memory element 221 and the gate voltage transmission element 222 to turn off the gate voltage transmission element 222. Since the gate voltage transmission element 222 is electrically disconnected from the memory element 221, a deterioration of the touch sensing function during the touch period may be reduced or prevented.

The mode selection element 224 may provide the touch gate voltage to the gate line based on the gate-off signal GOF during the touch period. For example, the mode selection element 224 may be a thin film transistor. In this case, a first terminal of the mode selection element 224 may be connected to the voltage line VL to receive the touch gate voltage, a second terminal of the mode selection element 224 may be connected to the gate line, and a control terminal of the mode selection element 224 may be connected to the gate-off signal line GOL to receive the gate-off signal GOF. That is, the mode selection element 224 may be turned on during the touch period.

The discharging circuit 230 receives a post-carry signal Cn+1 during the discharging time of the display period. When the shift register 200 is the second shift register 122, the discharging time may be the fourth time and the post-carry signal Cn+1 may be the third carry signal C3 output from the third shift register 123. The discharging circuit 230 forms a discharging path of the memory element 221 during the discharging time, and the memory element 221 is discharged. The gate voltage transmission element 222 may be turned off by discharging of the memory element 221.

Figure 6:
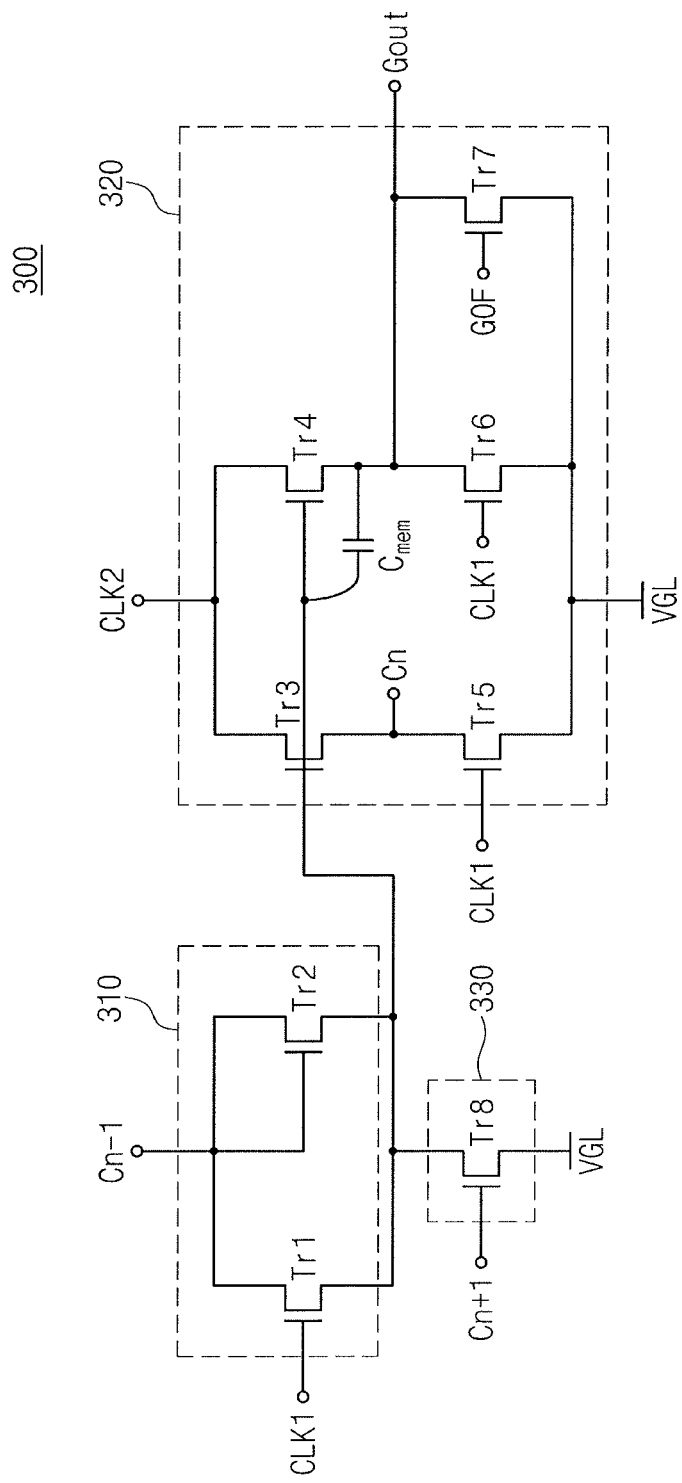
FIG. 6 illustrates a circuit diagram of a configuration of a shift register that does not include the switch element shown in FIG. 5.

FIG. 6 is a circuit diagram illustrating a configuration of a shift register that does not include the switch element shown in FIG. 5. Referring to FIG. 6, a shift register 300 includes a charging circuit 310, a gate control circuit 320, and a discharging circuit 330. The shift register 300 will be understood as an embodiment of a shift register that charges a memory element based on the pre-carry signal Cn−1 and discharges the memory element based on the post-carry signal Cn+1, but the shift register 300 is not limited to the circuit diagram in shown in FIG. 6.

The charging circuit 310 may charge a memory element Cmem based on the pre-carry signal Cn−1 during the charging time of the display period. The charging circuit 310 includes a first transistor Tr1 and a second transistor Tr2. Each of the first transistor Tr1 and the second transistor Tr2 may be an N-type thin film transistor. Alternatively, each of the first transistor Tr1 and the second transistor Tr2 may be a P-type thin film transistor, NMOS, or PMOS.

The first transistor Tr1 may provide the pre-carry signal Cn−1 to the gate control circuit 320 based on the first clock signal CLK1. A first terminal of the first transistor Tr1 receives the pre-carry signal Cn−1, a second terminal of the first transistor Tr1 is connected to the gate control circuit 320, and a control terminal of the first transistor Tr1 receives the first clock signal CLK1. For example, when the first clock signal CLK1 has the high level, the first transistor Tr1 may output the pre-carry signal Cn−1 to the gate control circuit 320. A first terminal and a control terminal of the second transistor Tr2 are connected to the one terminal of the first transistor Tr1, and a second terminal of the second transistor Tr2 is connected to the second terminal of the first transistor Tr1 and the gate control circuit 320.

The gate control circuit 320 may output the gate-on voltage and the carry signal Cn based on the first clock signal CLK1, the second clock signal CLK2, and the charged memory element Cmem during the control time of the display period. The gate control circuit 320 includes third to seventh transistors Tr3 to Tr7 and the memory element Cmem. Each of the third to seventh transistors Tr3 to Tr7 may be an N-type thin film transistor. However, it is not limited thereto, each of the third to seventh transistors Tr3 to Tr7 may be a P-type thin film transistor, NMOS, or PMOS.

The third transistor Tr3 may output the carry signal Cn based on the charged memory element Cmem and the second clock signal CLK2. A first terminal of the third transistor Tr3 receives the second clock signal CLK2, a second terminal of the third transistor Tr3 is connected to an output terminal of the carry signal Cn, and a control terminal of the third transistor Tr3 is connected to one terminal of the memory element Cmem. The third transistor Tr3 may be turned on based on the charging of the memory element Cmem in the control time. The third transistor Tr3 may output the carry signal Cn based on the second clock signal CLK2 having the high level during the control time.

The fourth transistor Tr4 may provide the gate-on voltage to the gate line based on the charged memory element Cmem and the second clock signal CLK2. The fourth transistor Tr4 may be the gate voltage transmission element 222 shown in FIG. 5. One terminal of the fourth transistor Tr4 receives the second clock signal CLK2, the other terminal of the fourth transistor Tr4 is connected to the gate line, and a control terminal of the fourth transistor Tr4 is connected to the one terminal of the memory element Cmem. The fourth transistor Tr4 may be turned on based on the charging of the memory element Cmem in the control time. The fourth transistor Tr4 may output the gate-on voltage to the gate line based on the second clock signal CLK2 having the high level during the control time.

The fifth transistor Tr5 is turned off during the control time to prevent the carry signal Cn from being provided in a different path. A first terminal of the fifth transistor Tr5 is connected to the other terminal of the third transistor Tr3, a second terminal of the fifth transistor Tr5 is connected to the voltage line VL to receive the gate low voltage VGL, and a control terminal of the fifth transistor Tr5 receives the first clock signal CLK1. In the touch period, the gate low voltage VGL may be a gate-off voltage that turns off the pixel transistor TR of the touch display device 100. The fifth transistor Tr5 may be turned off based on the first clock signal CLK1 having the low level during the control time.

The fifth transistor Tr5 may lower a voltage level of the terminal outputting the carry signal Cn to the gate low voltage VGL so that other shift registers do not output the gate-on voltage to the gate lines after the output of the carry signal Cn. The fifth transistor Tr5 may be turned on based on the first clock signal CLK1 having the high level and may lower the voltage level of the terminal outputting the carry signal Cn to the gate low voltage VGL.

The sixth transistor Tr6 is turned off during the control time to prevent the gate-on voltage from being provided in a different path. A first terminal of the sixth transistor Tr6 is connected to the other terminal of the fourth transistor Tr4, a second terminal of the sixth transistor Tr6 is connected to the voltage line VL, and a control terminal of the sixth transistor Tr6 receives the first clock signal CLK1. The sixth transistor Tr6 may be turned off based on the first clock signal CLK1 having the low level during the control time. Additionally, the sixth transistor Tr6 may be turned on during the discharging time to form the discharging path of the memory element Cmem together with the discharging circuit 330. The sixth transistor Tr6 may be turned on during the discharging time to lower a voltage level of the gate line to the gate low voltage VGL.

The seventh transistor Tr7 may be turned on during the touch period to output the touch gate voltage. The seventh transistor Tr7 may be the mode selection element 224. A first terminal of the seventh transistor Tr7 is connected to the gate line, a second terminal of the seventh transistor Tr7 receives the gate low voltage VGL, and a control terminal of the seventh transistor Tr7 receives the gate-off signal GOF. During the touch period, the gate low voltage VGL may be the touch gate voltage which is an AC voltage for minimizing a potential difference between the gate line and the touch electrode. The seventh transistor Tr7 may be turned on in the touch period and may be turned off in the display period based on the gate-off signal GOF.

The memory element Cmem is charged based on the charging circuit 310 during the charging time, holds the charged state during the control time, and is discharged based on the discharging circuit 330 during the discharging time. The memory element Cmem may be a capacitor element or the memory element 221 shown in FIG. 5. A first terminal of the memory element Cmem may be connected to the control terminal of the fourth transistor Tr4 and second terminal of the memory element Cmem may be connected to the second terminal of the fourth transistor Tr4. Therefore, when the memory element Cmem is charged, the fourth transistor Tr4 is turned on.

The memory element Cmem is not discharged when proceeding to the touch period without the discharge time after the control time. In this case, the fourth transistor Tr4 may hold the turn on state during the touch period. During the touch period, the touch gate voltage is applied to the gate line through the seventh transistor Tr7, but a part of the touch gate voltage may be provided to the turned on fourth transistor Tr4. In this case, a difference in equivalent impedance caused by the gate control circuit 320 may be generated as compared with other gate lines. That is, a touch value measured by a pixel PIX and a touch electrode TE connected to the gate control circuit 320 may have a different value from touch values measured by pixels PIX and touch electrodes TE connected to other gate lines. For example, the touch value measured by the pixel PIX and the touch electrode TE connected to the gate control circuit 320 may have an offset value larger than peripheral touch values.

Additionally, when the fourth transistor Tr4 is a thin film transistor, a change of a threshold voltage of the fourth transistor Tr4 may be larger than a crystalline silicon over time. The fourth transistor Tr4 connected to the pixels driven when changing from the display period to the touch period has more stress than gate voltage transmission elements included in other shift registers connected to the pixels driven during the display period. As a result, the change of the threshold voltage of the fourth transistor Tr4 may be larger than those of other gate voltage transmission elements. The longer the display is used, the larger image deterioration occurs in a display area of pixels connected to the fourth transistor Tr4. In this case, a display quality may degrade in the pixels due to the image deterioration.

The discharging circuit 330 provides the discharging path of the memory element Cmem. The discharging circuit 330 may discharge the memory element Cmem based on the post-carry signal Cn+1. The discharging circuit 330 includes an eighth transistor Tr8. The eighth transistor Tr8 may be an N-type thin film transistor, but, it is not limited thereto, the eighth transistor Tr8 may be a P-type thin film transistor, NMOS, or PMOS. A first terminal of the eighth transistor Tr8 is connected to the first terminal of the memory element Cmem, a second terminal of the eighth transistor Tr8 receives the gate low voltage VGL, and a control terminal of the eighth transistor Tr8 receives the post-carry signal Cn+1.

Figure 7:
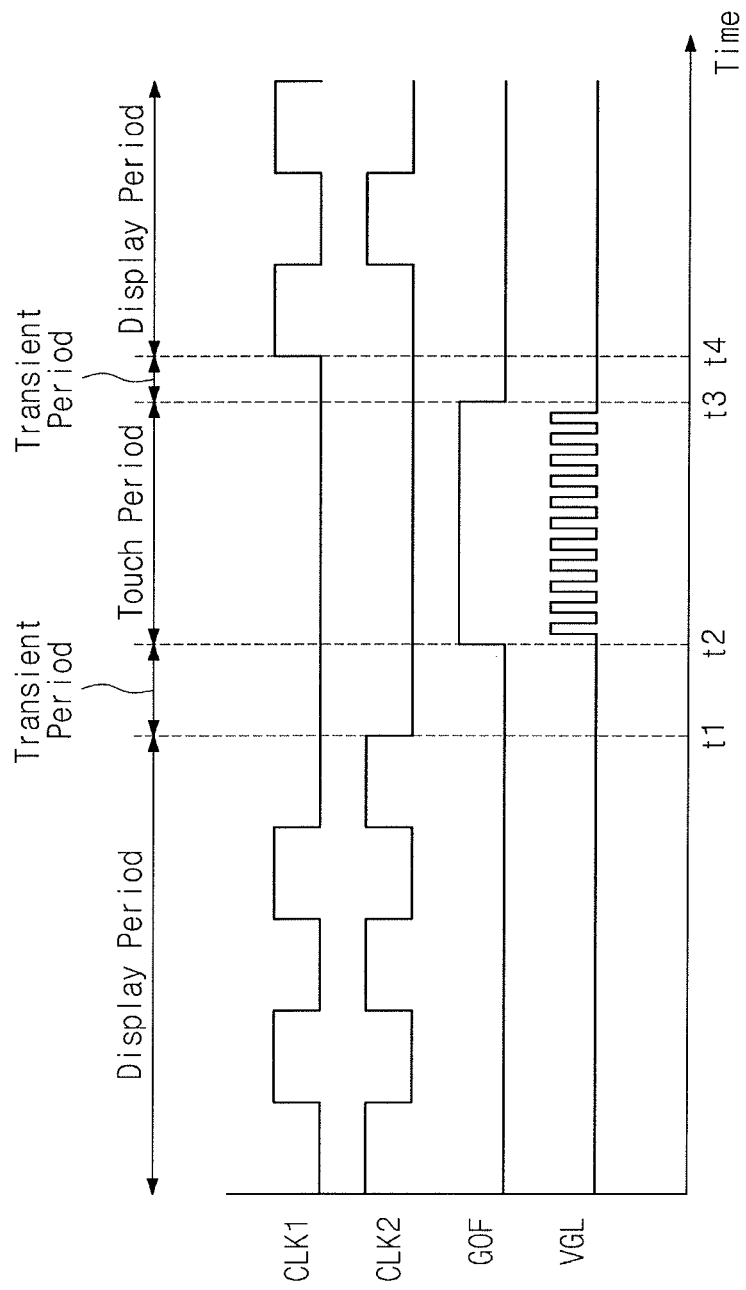
FIG. 7 illustrates a timing diagram of an operation of the shift register shown in FIG. 6.

FIG. 7 is a timing diagram illustrating an operation of the shift register shown in FIG. 6. For the convenience of explanation, the timing diagram shown in FIG. 7 will be described with reference to the reference numerals of FIG. 6. Referring to FIG. 3, waveforms of the first clock signal CLK1, the second clock signal CLK2, the gate-off signal GOF, and the gate low voltage VGL are shown versus time. An operation period of the shift register 300 may include the display period, a transient period, and the touch period. The transient period may be formed between the display period and the touch period, and vice versa. In particular, the transient period may include a first transient period between the display period and the touch period, and a second transient period between the touch period and the next display period.

The display period extends to a first time t1. The gate-off signal GOF and the gate low voltage VGL hold a low level during the display period. The first clock signal CLK1 and the second clock signal CLK2 are inverted from each other during the display period. When the first clock signal CLK1 has the high level, the memory element Cmem is charged, and the gate low voltage VGL having the low level is output to the gate line. Thereafter, when the first clock signal CLK1 has the low level and the second clock signal CLK2 has the high level, the gate-on voltage is output to gate line based on the charged memory element Cmem.

The transient period, e.g., the first transient period, extends from the first time t1 to a second time t2. The gate-off signal GOF and the gate low voltage VGL hold the low level during the transient period. The first clock signal CLK1 and the second clock signal CLK2 are not inverted from each other and hold the low level during the transient period. The touch display device 100 may stop a data writing operation to apply the data voltage during the transient period, and circuits to apply a signal for the touch sensing may be implemented in the touch display driving integrated circuit. An operation for the touch sensing may be performed during the transient period When the shift register 300 outputs the gate-on voltage based on the first clock signal CLK1 having the low level and the second clock signal CLK2 having the high level until the first time t1. The memory element Cmem is not discharged after the second time t2. The memory element Cmem may be discharged when the sixth transistor Tr6 is turned on, but the memory element Cmem is not discharged because the first clock signal CLK1 has the low level. That is, the fourth transistor Tr4 is turned on during the transient period and the touch period.

The touch period is defined from the second time t2 to a third time t3. The gate-off signal GOF has a high level during the touch period. Unlike what is illustrated in FIG. 7, the gate-off signal GOF may be toggled on the basis of the high level during the touch period. The seventh transistor Tr7 may be turned on to output the gate low voltage VGL. The gate low voltage VGL may be an alternating current (AC) voltage that is toggled to have the same period and variation as the gate-off signal GOF that is toggled to eliminate a parasitic capacitance between a gate electrode and the touch electrode. For example, the gate-off signal GOF and the gate low voltage VGL may have a square wave pattern, e.g., having a same periodicity and may be synchronized, during the touch period, that returns to a high level and a low level, respectively. Additionally, a gate-source voltage of the seventh transistor Tr7 may be held constant based on the toggled gate-off signal GOF and the toggled gate low voltage VGL.

During the touch period, the first clock signal CLK1 and the second clock signal CLK2 hold the low level. The memory element Cmem is held in a charged state, and the fourth transistor Tr4 is turned on. Therefore, a part of the gate low voltage VGL is provided to the turned on fourth transistor Tr4. Therefore, a touch value sensed by a touch electrode TE connected to the shift register 300 may be greater than touch values sensed by other touch electrodes TE. That is, even though the user does not touch the touch electrode TE connected to the shift register 300, a touch may be erroneously detected at the touch electrode TE connected to the shift register 300.

The transient period, e.g., the second transient period, is defined from the third time t3 to a fourth time t4. The gate-off signal GOF and the gate low voltage VGL hold the low level in the transient period. The first clock signal CLK1 and the second clock signal CLK2 hold the low level during the transient period. Therefore, the memory element Cmem is not discharged, and the fourth transistor Tr4 is turned on.

The display period is again defined from the fourth time t4. The gate-off signal GOF and the gate low voltage VGL hold the low level during the display period. The first clock signal CLK1 and the second clock signal CLK2 are inverted from each other in the display period. At the fourth time t4, the first clock signal CLK1 has the high level and the second clock signal CLK2 has the low level. At this time, the memory element Cmem is discharged and the gate low voltage having the low level is output to the gate line.

Figure 8:
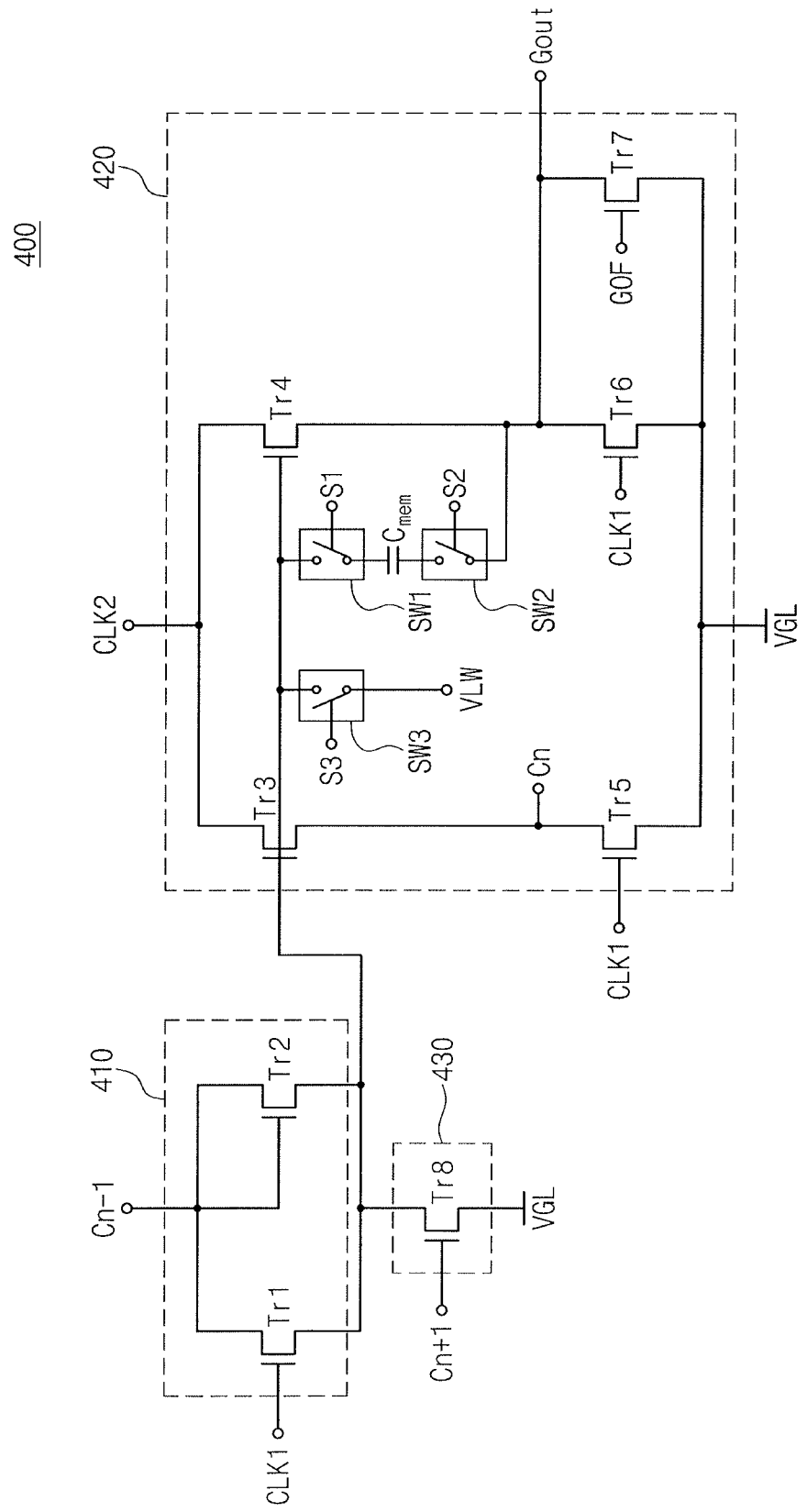
FIG. 8 illustrates a circuit diagram of a configuration of a shift register according to an embodiment.

FIG. 8 is a circuit diagram illustrating a configuration of a shift register 400 according to an embodiment. FIG. 8 is a specific circuit diagram of the shift register 200 shown in FIG. 5. Referring to FIG. 8, the shift register 400 includes a charging circuit 410, a gate control circuit 420, and a discharging circuit 430. The shift register 400 shown in FIG. 8 will be understood as an example embodiment to prevent deterioration of the touch function that may be caused by the memory element Cmem, but embodiments are not limited to the circuit diagram in shown in FIG. 8. For the convenience of explanation, the circuit diagram shown in FIG. 8 will be described with reference to the reference numerals of FIG. 5.

The charging circuit 410 includes first and second transistors Tr1 and Tr2. The gate control circuit 420 includes third to seventh transistors Tr3 to Tr7. The discharging circuit 430 includes an eighth transistor Tr8. Since configurations of the first to eighth transistors Tr1 to Tr8 are substantially the same as those of the first to eighth transistors Tr1 to Tr8 shown in FIG. 6, detailed descriptions with respect to the first to eighth transistors Tr1 to Tr8 will be omitted. The fourth transistor Tr4 may be the gate voltage transmission element 222 shown in FIG. 5, and the seventh transistor Tr7 may be the mode selection element 224 shown in FIG. 5.

The first to eighth transistors Tr1 to Tr8 may be the same type transistors. For example, the first to eighth transistors Tr1 to Tr8 may be N-type thin film transistors. When the first to eighth transistors Tr1 to Tr8 are implemented as a single type, a manufacturing cost of the display panel may be reduced. However, the first to eighth transistors Tr1 to Tr8 may be implemented as P-type thin film transistors or N-type and P-type thin film transistors.

The gate control circuit 420 further includes the memory element Cmem and first to third switching elements SW1 to SW3. The memory element Cmem may be the memory element 221 shown in FIG. 5. The first to third switching elements SW1 to SW3 may be the switching element 223 shown in FIG. 5. The memory element Cmem is charged when the shift register 400 receives the pre-carry signal Cn−1 during the display period. The charged memory element Cmem turns on the fourth transistor Tr4 when the shift register 400 receives the second clock signal CLK2 having the high level during the display period. In this case, the fourth transistor Tr4 outputs the gate-on voltage to the gate line. The memory element Cmem is discharged when the shift register 400 receives the post-carry signal Cn+1 during the display period.

The first switching element SW1 and the second switching element SW2 electrically connect the memory element Cmem and the fourth transistor Tr4 during the display period, and electrically disconnect the memory element Cmem and the fourth transistor Tr4 during the touch period. A first terminal of the first switching element SW1 is connected to the control terminal of the fourth transistor Tr4 and a second terminal of the first switching element SW1 is connected to the first terminal of the memory element Cmem. The first switching element SW1 may be turned on during the display period and turned off during the touch period based on a first switching signal S1. A first terminal of the second switching element SW2 is connected to a second terminal of the memory element Cmem and a second terminal of the second switching element SW2 is connected to the second terminal of the fourth transistor Tr4. The second switching element SW2 may be turned on during the display period and turned off during the touch period based on a second switching signal S2.

The first switching element SW1 and the second switching element SW2 prevent the fourth transistor Tr4 from being turned on by the memory element Cmem during the touch period. That is, during the touch period, the first and second switching elements SW1 and SW2 are turned off, and the third switch element SW3, to be described below, is turned on so that a low voltage VLW is applied to the control terminal of the fourth transistor Tr4. The fourth transistor Tr4 is turned off by low voltage VLW during the touch period. Therefore, a part of the touch gate voltage may be prevented from being provided to the turned on fourth transistor Tr4. As a result, deterioration of the touch sensing function of the touch display device is reduced or prevented, and deterioration of the display function is further reduced or prevented. The gate control circuit 420 shown in FIG. 8 includes the first and second switching elements SW1 and SW2. Alternatively, the gate control circuit 420 may include only one of the first and second switching elements SW1 and SW2.

The third switching element SW3 provides the low voltage VLW to the fourth transistor Tr4 to turn off the fourth transistor Tr4 during the touch period. A first terminal of the third switching element SW3 is connected to the control terminal of the fourth transistor Tr4 and a second terminal of the third switching element SW3 receives the low voltage VLW. The third switching element SW3 may be turned off during the display period and turned on during the touch period based on a third switching signal S3. The low voltage VLW has a voltage level lower than a threshold voltage of the fourth transistor Tr4.

Figure 9:
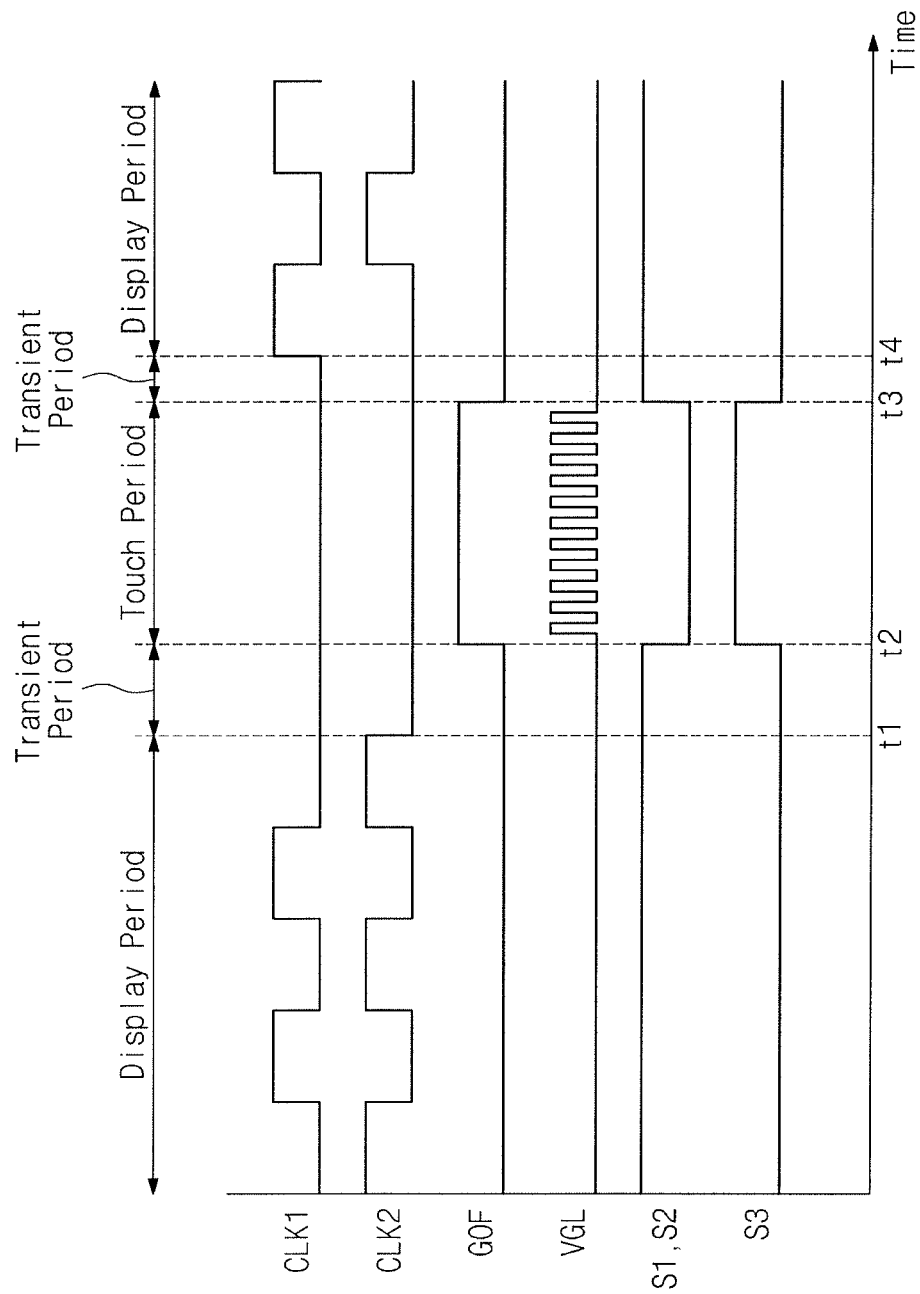
FIG. 9 illustrates a timing diagram of an operation of the shift register shown in FIG. 8.

FIG. 9 is a timing diagram illustrating an operation of the shift register shown in FIG. 8. For the convenience of explanation, the timing diagram shown in FIG. 9 will be described with reference to the reference numerals of FIG. 8. Referring to FIG. 8, waveforms of the first clock signal CLK1, the second clock signal CLK2, the gate-off signal GOF, the gate low voltage VGL, and the first to third switching signals S1 to S3 are shown versus time. An operation period of the shift register 400 may include the display period, the transient period, and the touch period. The transient period may be between the display period and the touch period, and vice versa. The waveforms of the first clock signal CLK1, the second clock signal CLK2, the gate-off signal GOF, and the gate low voltage VGL are substantially the same as those of the first clock signal CLK1, the second clock signal CLK2, the gate-off signal GOF, and the gate low voltage VGL shown in FIG. 7.

During the display period and during the transient period, the first and second switching signals S1 and S2 may have a high level, and the third switching signal S3 may have a low level. During the touch period, the first and second switching signals S1 and S2 may have a low level, and the third switching signal S3 may have a high level. In this case, the first to third switching elements SW1 to SW3 are turned on by a switching signal having the high level and turned off by a switching signal having the low level. The first to third switching elements SW1 to SW3 may be N-type thin film transistors. However, the first to third switching elements SW1 to SW3 may be formed as various types. For example, when the first to third switching elements SW1 to SW3 may be P-type thin film transistors, the levels of the first to third switching signals S1 to S3 shown in FIG. 9 may be inverted and provided to the first to third switching elements SW1 to SW3.

The fourth transistor Tr4 is turned off by the first to third switching signals S1 to S3 during the touch period and turned on by the first to third switching signals S1 to S3 during the display period. During the transient period, the fourth transistor Tr4 is electrically connected to the memory element Cmem and the fourth transistor Tr4 is turned on. However, unlike illustrated in FIG. 9, during the transient period, the first and second switching signals S1 and S2 may have the low level, and the third switching signal S3 may have the high level. That is, the fourth transistor Tr4 may be turned off during the transient period. Since the touch display device 100 does not perform the display function or the touch function during the transient period, the fourth transistor Tr4 and the memory element Cmem may be electrically disconnected from each other during the transient period.

Figure 10:
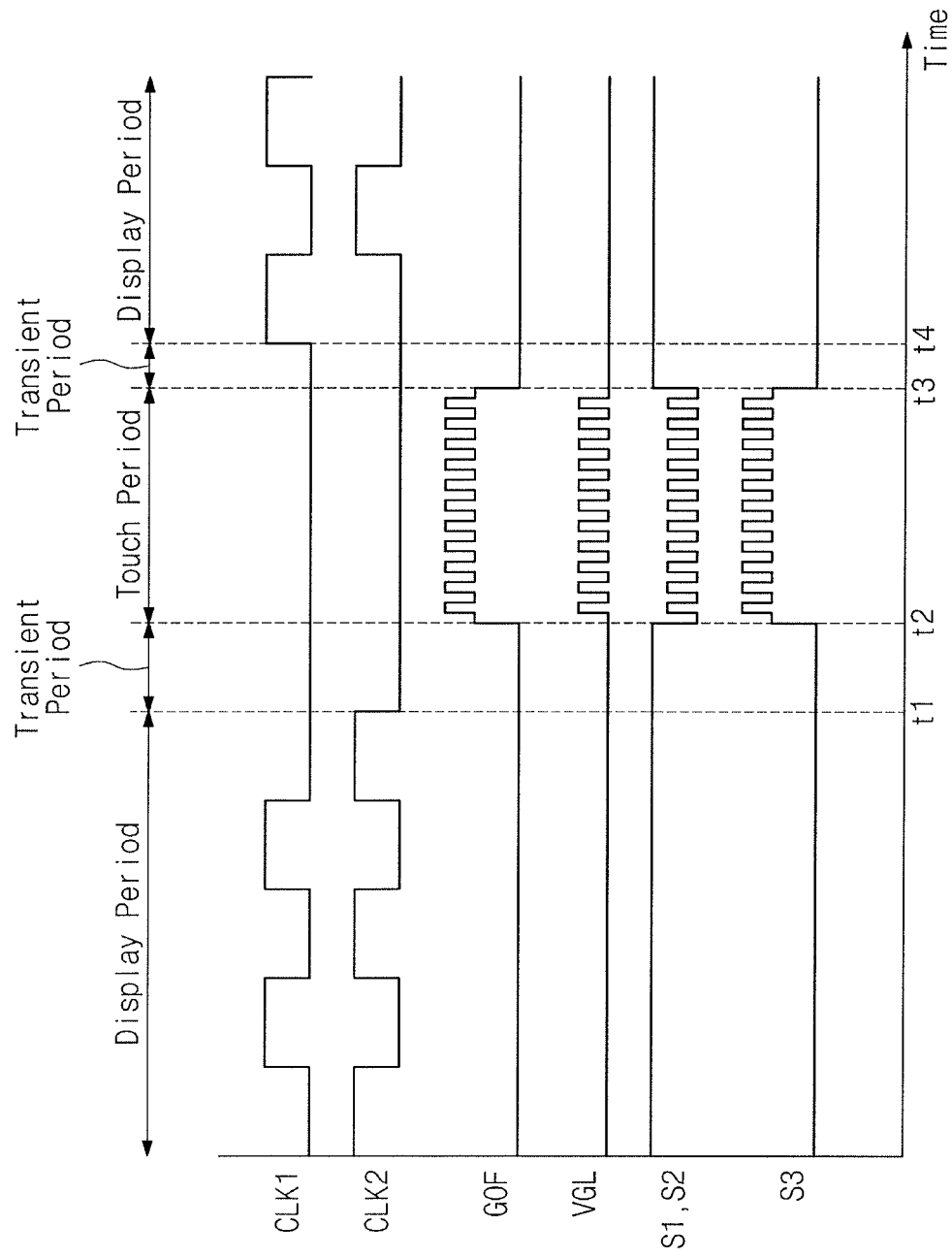
FIG. 10 illustrates a timing diagram of an operation of the shift register shown in FIG. 8.

FIG. 10 is a timing diagram illustrating an operation of the shift register shown in FIG. 8. For the convenience of explanation, the timing diagram shown in FIG. 10 will be described with reference to the reference numerals of FIG. 8. Referring to FIG. 10, waveforms of the first clock signal CLK1, the second clock signal CLK2, the gate-off signal GOF, the gate low voltage VGL, and the first to third switching signals S1 to S3 are shown versus time. An operation period of the shift register 400 may include the display period, the transient period, and the touch period. The transient period may be between the display period and the touch period. The waveforms of the first clock signal CLK1 and the second clock signal CLK2 are substantially the same as those of the first clock signal CLK1 and the second clock signal CLK2 shown in FIG. 9.

The gate-off signal GOF and the gate low voltage VGL have the low level during the display period and the transient period. During the touch period, the gate-off signal GOF may be toggled on the basis of the high level and the gate low voltage VGL may be toggled on the basis of the low level. For example, the gate-off signal GOF and the gate low voltage VGL may have a square wave pattern, e.g., having a same periodicity and may be synchronized, during the touch period, that returns to a high level and a low level, respectively. A parasitic capacitance between the gate electrode and the touch electrode may be minimized based on the toggled gate low voltage VGL. A variation of the gate-source voltage of the seventh transistor Tr7 may be minimized based on the toggled gate low voltage VGL and the toggled gate-off signal GOF.

During the display period and the transient period, the first and second switching signals S1 and S2 have the high level, and the third switching signal S3 has a low level. During the touch period, the first and second switching signals S1 and S2 may be toggled on the basis of the low level, and the third switching signal S3 may be toggled on the basis of the high level. For example, the first and second switching signals S1 and S2, and the third switching signal S3 may have a square wave pattern, e.g., having a same periodicity and may be synchronized, during the touch period, that returns to a low level and a high level, respectively. During the touch period, the first and second switching elements SW1 and SW2 are turned off, and the third switching element SW3 is turned on. Since the first to third switching signals S1 to S3 are toggled, a gate-source voltage of each of the first to third switching elements SW1 to SW3 may be held constant.

The fourth transistor Tr4 is turned off by the first to third switching signals S1 to S3 during the touch period and turned on by the first to third switching signals S1 to S3 during the display period. During the transient period, the fourth transistor Tr4 is electrically connected to the memory element Cmem and the fourth transistor Tr4 is turned on. A low voltage VLW is applied to the control terminal of the fourth transistor Tr4 based on the turned on third switching element SW3 during the touch period. The low voltage VLW may be toggled, and a gate-source voltage of the fourth transistor Tr4 may be held constant based on the toggled low voltage VLW and the toggled gate low voltage VGL FIGS. 11A to 11D are views for describing configurations of the first to third switching elements shown in FIG. 8. For the convenience of explanation, the configurations shown in FIGS. 11A to 11D will be described with reference to the reference numerals of FIG. 8. The first to third switching elements SW1 to SW3 shown in FIGS. 11A to 11D will be understood as an example embodiment, but the first to third switching elements SW1 to SW3 are not limited to the configurations in shown in FIGS. 11A to 11D. FIGS. 11A to 11D will be understood as an embodiment in which signals for driving an existing gate driving integrated circuit are used to control on/off of the switching elements, Referring to FIG. 11A the first switching element SW1 may include an N-type thin film transistor Tsn. Also, each of the second and third switching elements SW2 and SW3 may include the N-type thin film transistor Tsn. When each of the first and second switching elements SW1 and SW2 include the N-type thin film transistor Tsn, the first and second switching signals S1 and S2 may have the high level during the display period and may have the low level during the touch period. When the third switching element SW3 include the N-type thin film transistor Tsn, the third switching signal S3 may have the low level during the display period and may have the high level during the touch period.

Figure 11A:
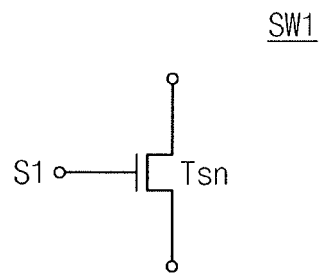
FIGS. 11A to 11D illustrate views for describing configurations of the first to third switching elements shown in FIG. 8.
Figure 11B:
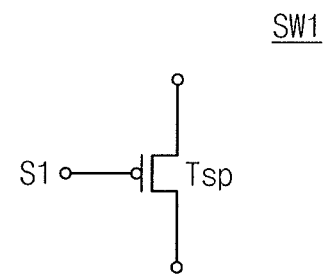

Referring to FIG. 11B, the first switching element SW1 may include a P-type thin film transistor Tsp. Also, each of the second and third switching elements SW2 and SW3 may include the P-type thin film transistor Tsp. When each of the first and second switching elements SW1 and SW2 include the P-type thin film transistor Tsp, the first and second switching signals S1 and S2 may have the low level during the display period and may have the high level during the touch period. When the third switching element SW3 include the P-type thin film transistor Tsp, the third switching signal S3 may have the high level during the display period and may have the low level during the touch period.

Figure 11C:
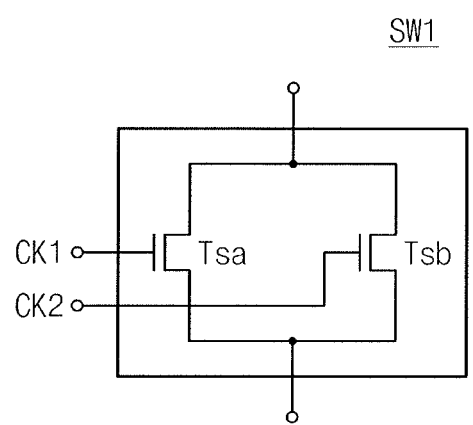

Referring to FIG. 11C, the first switching element SW1 may include a first thin film transistor Tsa and a second thin film transistor Tsb. Also, the second switching element SW2 may include the first thin film transistor Tsa and the second thin film transistor Tsb. The first thin film transistor Tsa and the second thin film transistor Tsb may be an N-type thin film transistor. A first terminal of the first thin film transistor Tsa and a first terminal of the second thin film transistor Tsb are connected to the memory element Cmem or the fourth transistor Tr4, a second terminal of the first thin film transistor Tsa and a second terminal of the second thin film transistor Tsb are connected to the fourth transistor Tr4 or the memory element Cmem. A control terminal of the first thin film transistor Tsa receives the first clock signal CLK1 and a control terminal of the second thin film transistor Tsb receives the second clock signal CLK2.

Since the first clock signal CLK1 and the second clock signal CLK2 are inverted from each other during the display period, one of the first thin film transistor Tsa and the second thin film transistor Tsb is turned on. Therefore, the fourth transistor Tr4 is electrically connected to the memory element Cmem during the display period. The first clock signal CLK1 and the second clock signal CLK2 hold the low level during the transient period and the touch period. Therefore, the first thin film transistor Tsa and the second thin film transistor Tsb are turned off during the transient period and the touch period. Therefore, the fourth transistor Tr4 is electrically disconnected to the memory element Cmem during the touch period, and the fourth transistor Tr4 is turned off during the touch period. Since the first switching element SW1 shown in FIG. 11C uses existing clock signals, an additional line to provide a switching signal to the gate driving integrated circuit 120 is not needed.

Figure 11D:
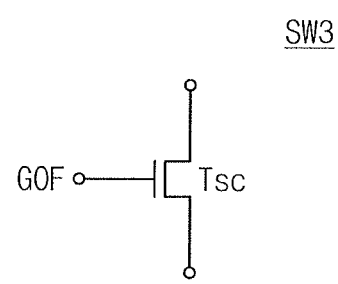

FIG. 11D, the third switching element SW3 may include an N-type thin film transistor Tsc. The third switching element SW3 may be the third switching element SW3 shown in FIG. 8. The third switching element SW3 may provide the low voltage VLW based on the gate-off signal GOF to the control terminal of the fourth transistor Tr4. The gate-off signal GOF has the high level during the touch period. Therefore, during the touch period, the third switching element SW3 provides the low voltage VLW to the control terminal of the fourth transistor Tr4, and the fourth transistor Tr4 during turned off.

Since the third switching element SW3 shown in FIG. 11D uses the existing gate-off signal GOF, an additional line to provide a switching signal to the gate driving integrated circuit 120 is not needed. When the third switching element SW3 is operated based on the gate-off signal GOF, the memory element Cmem may be electrically disconnected to the fourth transistor Tr4 during the touch period.

Figure 12:
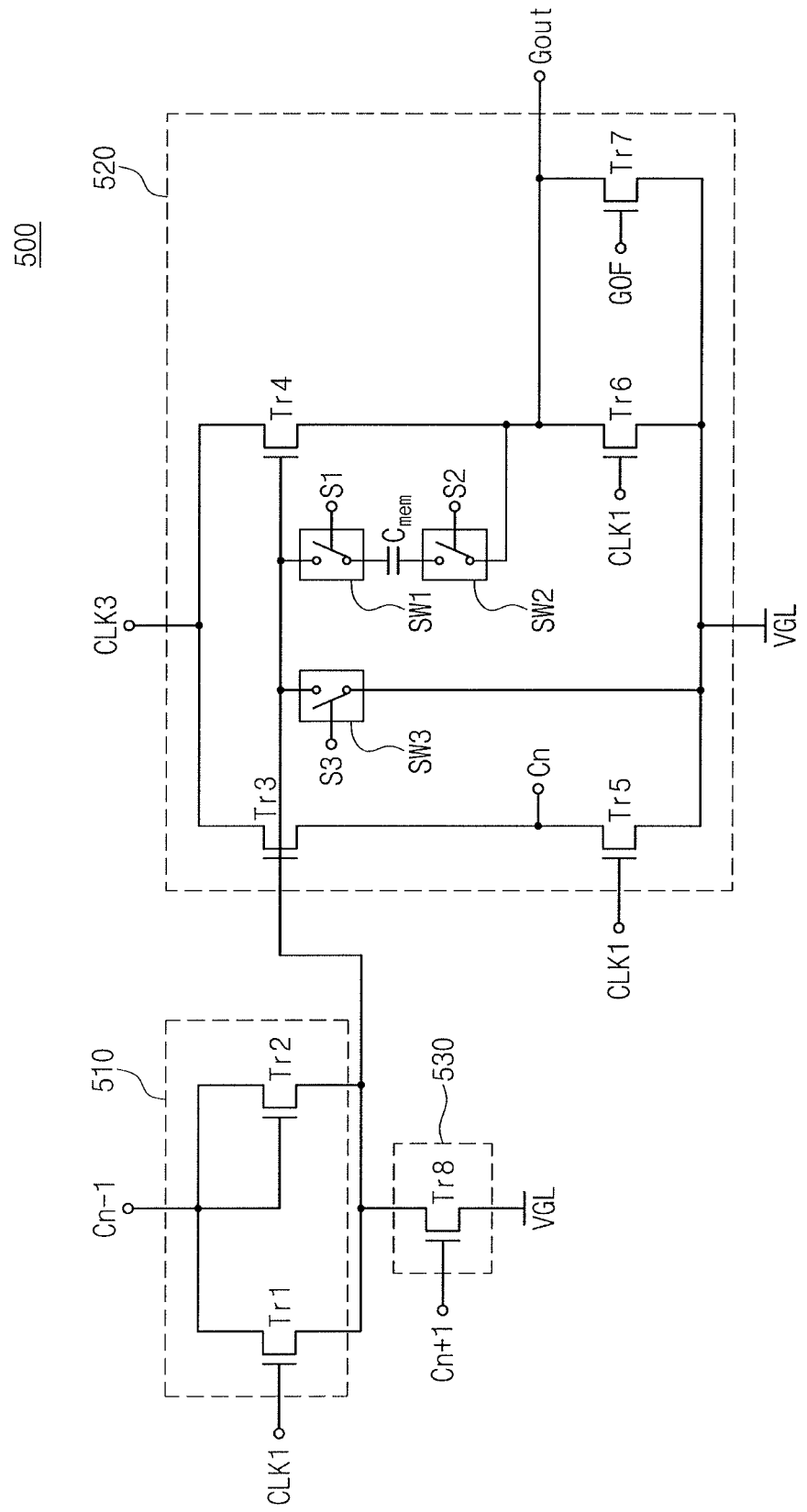
FIG. 12 illustrates a circuit diagram of a configuration of a shift register according to an embodiment.

FIG. 12 is a circuit diagram illustrating a configuration of a shift register 500 according to an embodiment. FIG. 12 is a specific circuit diagram of the shift register 200 shown in FIG. 5. Referring to FIG. 12, the shift register 500 includes a charging circuit 510, a gate control circuit 520, and a discharging circuit 530. For the convenience of explanation, the circuit diagram shown in FIG. 12 will be described with reference to the reference numerals of FIG. 5. Since configurations of the charging circuit 510 and the discharging circuit 530 are substantially the same as those of the charging circuit 510 and the discharging circuit 530 shown in FIG. 8, detailed descriptions will be omitted.

The gate control circuit 520 includes third to seventh transistors Tr3 to Tr7, a memory element Cmem, and first to third switching elements SW1 to SW3. Since configurations of the third to seventh transistors Tr3 to Tr7, the memory element Cmem, and the first and second switching elements SW1 and SW2 are substantially the same as those of the third to seventh transistors Tr3 to Tr7, the memory element Cmem, and the first and second switching elements SW1 and SW2 shown in FIG. 8, detailed descriptions will be omitted.

Unlike the third switching element SW3 shown in FIG. 8, the third switching element SW3 provides the gate low voltage VGL to the fourth transistor Tr4 to turn off the fourth transistor Tr4 during the touch period. A first terminal of the third switching element SW3 is connected to the control terminal of the fourth transistor Tr4 and a second terminal of the third switching element SW3 receives the gate low voltage VGL. The third switching element SW3 is turned on during the touch period and turned off during the display period based on the third switching signal S3. The gate low voltage VGL has a voltage level lower than a threshold voltage of the fourth transistor Tr4.

Figure 13:
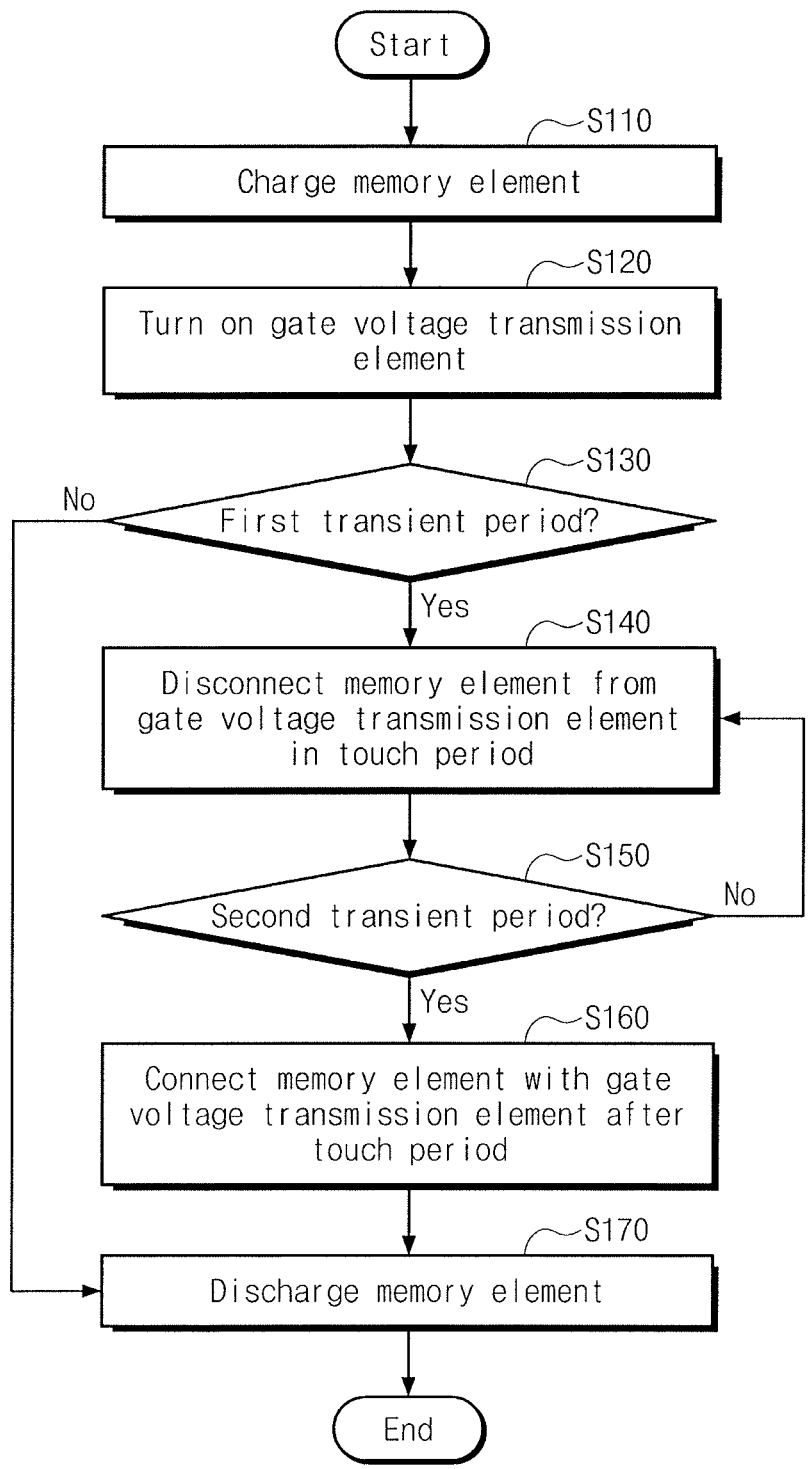
FIG. 13 illustrates a flowchart for describing an operation of the gate driving integrated circuit according to an embodiment.

FIG. 13 is a flowchart for describing an operation of the gate driving integrated circuit according to an embodiment. Referring to FIG. 13, the operation of the gate driving integrated circuit is performed in the gate driving integrated circuit 120 shown in FIG. 2 or the shift register 200 shown in FIG. 5. For the convenience of explanation, the flowchart shown in FIG. 13 will be described with reference to the reference numerals of FIGS. 2 and 5.

In operation S110, the gate driving integrated circuit 120 charges the memory element 221. The gate driving integrated circuit 120 may charge the memory element 221 based on the strobe signal ST or the pre-carry signal Cn−1 generated based on the strobe signal ST during the display period. For example, the charging circuit 210 of the shift register 200 may charge the memory element 221 based on the first clock signal CLK1 having the high level and the pre-carry signal Cn−1 having the high level.

In operation S120, the gate voltage transmission element 222 is turned on. The gate voltage transmission element 222 may be turned on based on the charged memory element 221. At the same time, the gate driving integrated circuit 120 may output the gate-on voltage to the gate line based on the first clock signal CLK1 having the low level, the second clock signal CLK2 having the high level, and the charged memory element 221. Additionally, the gate voltage transmission element 222 may output the carry signal Cn.

When operation S130 determines the display period has ended, e.g., the first transient period is to begin, the first clock signal CLK1 and the second clock signal CLK2 are held at the low level before the gate driving integrated circuit 120 proceeds to the touch period to sense the touch. Then, the memory element 221 is not discharged and the process proceeds to operation S140. Alternatively, when operation S130 determines the display period is to continue, the display period is maintained and the process proceeds to operation S160 to discharge the memory element 221.

In operation S140, the switching element 223 electrically disconnects the memory element 221 and the gate voltage transmission element 222. The switching element 223 may electrically disconnect the memory element 221 and the gate voltage transmission element 222 during the touch period, but is not limited thereto, e.g., the switching element 223 may also electrically disconnect the memory element 221 and the gate voltage transmission element 222 during the transient period. In this case, the gate voltage transmission element 222 is turned off and a part of the gate low voltage VGL as the touch gate voltage may be prevented from being provided to the gate voltage transmission element 222. A low voltage lower than a threshold voltage of the gate voltage transmission element 222 may be applied to the gate voltage transmission element 222 to turn off the gate voltage transmission element 222.

When operation S150 determines the touch period has ended, e.g., the second transient period is to begin, the first clock signal CLK1 and the second clock signal CLK2 are held at the low level before the gate driving integrated circuit 120 proceeds to the display period again after the touch period. In this case, the process proceeds to operation S160 to discharge the memory element 221. When the touch period is maintained, the process proceeds to operation S140.

In operation S160, the switching element 223 electrically connects the memory element 221 and the gate voltage transmission element 222 again after the touch period has ended. The switching element 223 may electrically connect the memory element 221 and the gate voltage transmission element 222 during the second transient period after the touch period, but is not limited thereto, e.g., the switching element 223 may also electrically connect the memory element 221 and the gate voltage transmission element 222 during the display period.

In operation S170, the gate driving integrated circuit 120 discharges the memory element 221. The gate driving integrated circuit 120 may discharge the memory element 221 based on the post-carry signal Cn+1 in the display period.

Embodiments provide a gate driving integrated circuit and an operating method thereof capable of ensuring a reliability of a touch and display quality when a touch display device operates in a time-division method divided into a display period and a touch period.

According to the above, the gate driving integrated circuit and the operating method thereof may ensure the reliability of the touch and display quality by using a switch element that determines a connection relationship between a memory element and a gate voltage transmission element during the display period and the touch period.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A gate driving integrated circuit operating in a time-division method divided into a display period and a touch period, the gate driving integrated circuit comprising:
a charging circuit to charge a memory element during a charging time of the display period;
a gate control circuit including the memory element, the gate control circuit to output a gate-on voltage to a gate line based on the charged memory element during a control time of the display period; and
a discharging circuit to discharge the charged memory element during a discharging time of the display period,
wherein the gate control circuit is further to electrically disconnect the memory element from the gate control circuit during the touch period,
wherein the gate control circuit further includes:
a gate voltage transmission element; and
a first switching element connected between the gate voltage transmission element and the memory element, wherein the first switching element turns on to provide a voltage from the charged memory element to the gate voltage transmission element such that the gate voltage transmission element is turned on by the voltage from the charged memory element provided via the first switching element to provide the gate-on voltage to the gate line based on the voltage from the charged memory element during the control time,
wherein the first switching element electrically disconnects the memory element from the gate voltage transmission element to turn off the gate voltage transmission element during the touch period.

2. The gate driving integrated circuit as claimed in claim 1, wherein:
the gate control circuit further includes a second switching element providing a low voltage lower than a threshold voltage of the gate voltage transmission element to the gate voltage transmission element during the touch period, and
the first switching element electrically connects the gate voltage transmission element and the memory element during the display period.

3. The gate driving integrated circuit as claimed in claim 2, wherein:
the second switching element electrically disconnects the gate voltage transmission element and the memory element based on a first switching signal toggled on the basis of a low level during the touch period,
the first switching element provides the low voltage toggled on the basis of a second switching signal to a control terminal of the gate voltage transmission element during the touch period, and
the second switching signal is toggled on the basis of a high level.

4. The gate driving integrated circuit as claimed in claim 1, wherein the low voltage is applied to the gate line during the touch period.

5. The gate driving integrated circuit as claimed in claim 1, wherein:
the gate control circuit outputs the gate-on voltage based on a first clock signal and a second clock signal,
the first clock signal has a high level during the charging time, a low level during the control time, and the high level during the discharging time,
the second clock signal has a low level during the charging time, a high level during the control time, and the low level during the discharging time, and
the first clock signal and the second clock signal have a low level during a transient period between the display period and the touch period.

6. The gate driving integrated circuit as claimed in claim 5, wherein the charging circuit charges the memory element based on the first clock signal and a pre-carry signal output based on a control of a previous gate line in the charging time.

7. The gate driving integrated circuit as claimed in claim 5, wherein the discharging circuit discharges the memory element based on a post-carry signal output based on a control of a next gate line in the discharging time.

8. The gate driving integrated circuit as claimed in claim 5, wherein the gate control circuit is to output:
a gate-off voltage to the gate line based on the first clock signal having the high levels during the charging time and the discharging time,
the gate-on voltage to the gate line based on the second clock signal having the high level and the charged memory element during the control time, and
a carry signal simultaneously with the gate-on voltage based on the second clock signal having the high level and the charged memory element during the control time.

9. The gate driving integrated circuit as claimed in claim 5, wherein the first switching element includes:
a first transistor electrically connecting the memory element to the gate control circuit based on the first clock signal having the high level; and
a second transistor electrically connecting the memory element to the gate control circuit based on the second clock signal having the high level.

10. The gate driving integrated circuit as claimed in claim 1, wherein the gate control circuit further includes a mode selection element providing a toggled touch gate voltage to the gate line in the touch period.

11. A gate driving integrated circuit operating in a time-division method divided into a display period, a touch period, and a transient period between the display period and the touch period, the gate driving integrated circuit comprising:
a gate line; and
a shift register outputting a gate-on voltage to the gate line during a portion of the display period and outputting a touch gate voltage to the gate line during the touch period,
wherein the shift register includes:
a gate voltage transmission element; and
a switching element connected between the gate voltage transmission element and a memory element, wherein:
the memory element is charged by a charging circuit,
the first switching element turns on to provide a voltage from the charged memory element to the gate voltage transmission element such that the gate voltage transmission element is turned on by the voltage from the charged memory element provided via the first switching element to provide the gate-on voltage to the gate line based on the voltage from the charged memory element during the portion of the display period, and the switching element electrically connects the gate voltage transmission element to the memory element during the display period, and electrically disconnecting the gate voltage transmission element from the memory element to turn off the gate voltage transmission element during the touch period and the transient period.

12. The gate driving integrated circuit as claimed in claim 11, wherein:

the shift register is to output the gate-on voltage based on a first clock signal and a second clock signal during the display period, and output a gate-off voltage based on the first clock signal and the second clock signal during the transient period, and the first clock signal and the second clock signal have a high level and a low level repetitively during the display period, are inverted from each other during the display period, and hold a low level during the transient period.

13. The gate driving integrated circuit as claimed in claim 12, wherein:

the gate voltage transmission element provides the gate-on voltage to the gate line based on the second clock signal having the high level during the portion of the display period, and the memory element is charged based on the first clock signal having the high level before the portion of the display period and turns on the gate voltage transmission element based on the charged memory element.

14. The gate driving integrated circuit as claimed in claim 11, wherein the display period and the touch period are repeated one or more times during a frame period in which one frame is displayed.

15. The gate driving integrated circuit as claimed in claim 11, wherein:

the shift register outputs a toggled touch gate voltage to the gate line during the touch period, and the switching element electrically disconnects the gate voltage transmission element and the memory element based on a switching signal toggled during the touch period.

16. An operating method of a gate driving integrated circuit operating in a time-division method divided into a display period a touch period, the method comprising:

charging a memory element, included in the gate driving integrated circuit, by a charging circuit during a charging time of the display period;

turning on a gate voltage transmission element by providing a voltage to the gate voltage transmission element from the memory element, the voltage being based on a level of charge of the charged memory element, by turning on a switching element connected between the gate voltage transmission element and the memory element such that the gate voltage transmission element is turned on by the voltage from the charged memory element provided via the first switching element to provide a gate-on voltage to a gate line based on the voltage from the charged memory element, during a control time of the display period; and electrically disconnecting the memory element from the gate voltage transmission element, by turning off the switching element, to turn off the gate voltage transmission element during the touch period after the display period.

17. The operating method as claimed in claim 16, further comprising:

electrically connecting the memory element and the gate voltage transmission element during a discharge time of the display period and during a transient period after the touch period; and discharging the memory element.

18. The operating method as claimed in claim 16, further comprising:

providing a low voltage lower than a threshold voltage of the gate voltage transmission element to the gate voltage transmission element to turn off the gate voltage transmission element during the touch period.

* * * * *